(12) United States Patent
Hasegawa et al.

(10) Patent No.: US 9,346,511 B2
(45) Date of Patent: May 24, 2016

(54) INVERTED PENDULUM TYPE VEHICLE

(71) Applicant: HONDA MOTOR CO., LTD., Tokyo (JP)

(72) Inventors: Makoto Hasegawa, Wako (JP); Shinichiro Kobashi, Wako (JP); Shinya Shirokura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/223,360

(22) Filed: Mar. 24, 2014

(65) Prior Publication Data

US 2014/0297076 A1 Oct. 2, 2014

(30) Foreign Application Priority Data

Mar. 27, 2013 (JP) ................. 2013-067686

(51) Int. Cl.
*B62K 3/00* (2006.01)
*B60B 19/00* (2006.01)
(52) U.S. Cl.
CPC ............... *B62K 3/007* (2013.01); *B60B 19/003* (2013.01); *B60L 2260/34* (2013.01)
(58) Field of Classification Search
CPC .... B62K 3/007; B60B 19/003; B60L 2260/34
See application file for complete search history.

(56) References Cited

U.S. PATENT DOCUMENTS

| | | | |
|---|---|---|---|
| 5,385,210 A | 1/1995 | Harvey | |
| 5,791,425 A | 8/1998 | Kamen et al. | |
| 5,971,091 A | 10/1999 | Kamen et al. | |
| 6,302,230 B1 | 10/2001 | Kamen et al. | |
| 6,827,163 B2 | 12/2004 | Amsbury et al. | |
| 6,840,346 B2 | 1/2005 | Sugitani et al. | |
| 7,690,452 B2 | 4/2010 | Kamen et al. | |

(Continued)

FOREIGN PATENT DOCUMENTS

| | | |
|---|---|---|
| DE | 20 2007 007 673 U1 | 10/2007 |
| EP | 1 529 556 A2 | 5/2005 |

(Continued)

OTHER PUBLICATIONS

Al-Hadithi et al., "Fuzzy Optimal Control for Double Inverted Pendulum", 7th IEEE Conference on Industrial Electronics and Applications (ICIEA), 2012, pp. 1-5.
Chen, "Analysis and Design of Robust Feedback Control Systems for a Nonlinear Two-Wheel Inverted Pendulum System", 2012 International Symposium on Computer, Consumer and Control, IEEE, 2012, 1 page. (abstract only).

(Continued)

*Primary Examiner* — Todd Melton
(74) *Attorney, Agent, or Firm* — Birch, Stewart, Kolasch & Birch, LLP

(57) ABSTRACT

An inverted pendulum type vehicle capable of improving consistency of the intention of an operator and the motion condition of the vehicle. When a low frequency component of an estimate value Vb_estm1_y of the translational speed in the Y-axis direction of a vehicle system center of gravity of the entirety deviates from a dead zone of a processing unit and movement of the waist of an operator is sudden enough to generate a high frequency component in Vb_estm1_y, a target turning angular velocity ωz_cmd_gc is set to a positive value or a negative value depending on the deviation amount, and a turning suppression factor Kωz is adjusted to 0. Therefore, motion of actuator devices of a vehicle is controlled so that turning of the vehicle is suppressed and the vehicle system center of gravity of the entirety is translated to +Y-axis direction.

13 Claims, 9 Drawing Sheets

(56) References Cited

U.S. PATENT DOCUMENTS

| | | | |
|---|---|---|---|
| 7,740,099 B2 | 6/2010 | Field et al. | |
| 7,963,352 B2 | 6/2011 | Alexander | |
| 8,050,837 B2 | 11/2011 | Yamada | |
| 8,353,378 B2 | 1/2013 | Gomi et al. | |
| 8,408,339 B2 | 4/2013 | Makino | |
| 8,467,922 B2 | 6/2013 | Takenaka | |
| 8,467,948 B2 | 6/2013 | Takenaka et al. | |
| 8,522,902 B2 | 9/2013 | Gomi et al. | |
| 8,583,302 B2 * | 11/2013 | Akimoto et al. | 701/22 |
| 8,751,110 B2 | 6/2014 | Takenaka et al. | |
| 8,758,191 B2 | 6/2014 | Takenaka et al. | |
| 9,037,331 B2 | 5/2015 | Taira et al. | |
| 9,085,334 B2 | 7/2015 | Hoffman et al. | |
| 2001/0032743 A1 | 10/2001 | Kamen et al. | |
| 2002/0023787 A1 | 2/2002 | Kamen et al. | |
| 2004/0069543 A1 | 4/2004 | Kamen et al. | |
| 2004/0201271 A1 | 10/2004 | Kakinuma et al. | |
| 2005/0121238 A1 | 6/2005 | Ishii | |
| 2005/0121866 A1 | 6/2005 | Kamen et al. | |
| 2005/0126833 A1 | 6/2005 | Takenaka et al. | |
| 2007/0084662 A1 | 4/2007 | Oikawa | |
| 2007/0158117 A1 | 7/2007 | Alexander | |
| 2007/0251735 A1 | 11/2007 | Kakinuma et al. | |
| 2007/0296170 A1 | 12/2007 | Field et al. | |
| 2008/0161990 A1 | 7/2008 | Gansler | |
| 2008/0245594 A1 | 10/2008 | Ishii et al. | |
| 2008/0271938 A1 | 11/2008 | Gulak | |
| 2009/0055033 A1 | 2/2009 | Gansler et al. | |
| 2009/0105908 A1 | 4/2009 | Casey et al. | |
| 2009/0288900 A1 | 11/2009 | Takenaka et al. | |
| 2010/0017069 A1 | 1/2010 | Miki et al. | |
| 2010/0030440 A1 | 2/2010 | Kosaka | |
| 2010/0030441 A1 | 2/2010 | Kosaka | |
| 2010/0030442 A1 | 2/2010 | Kosaka | |
| 2010/0038960 A1 | 2/2010 | Takenaka et al. | |
| 2010/0070132 A1 | 3/2010 | Doi | |
| 2010/0071984 A1 | 3/2010 | Doi et al. | |
| 2010/0096905 A1 | 4/2010 | Takenaka et al. | |
| 2010/0114420 A1 | 5/2010 | Doi | |
| 2010/0114421 A1 | 5/2010 | Doi | |
| 2010/0114468 A1 | 5/2010 | Field et al. | |
| 2010/0152987 A1 | 6/2010 | Gorai | |
| 2010/0168993 A1 | 7/2010 | Doi et al. | |
| 2010/0235028 A1 | 9/2010 | Ishii | |
| 2010/0299044 A1 | 11/2010 | Miyake et al. | |
| 2011/0010066 A1 | 1/2011 | Fuwa | |
| 2011/0035101 A1 | 2/2011 | Kawada et al. | |
| 2011/0060518 A1 | 3/2011 | Kosaka | |
| 2011/0067936 A1 | 3/2011 | Takenaka et al. | |
| 2011/0070998 A1 | 3/2011 | Takenaka et al. | |
| 2011/0071714 A1 | 3/2011 | Takenaka | |
| 2011/0071715 A1 | 3/2011 | Akimoto et al. | |
| 2011/0071752 A1 | 3/2011 | Takenaka et al. | |
| 2011/0098884 A1 | 4/2011 | Doi | |
| 2011/0118968 A1 | 5/2011 | Takenaka et al. | |
| 2011/0130925 A1 | 6/2011 | Oikawa | |
| 2011/0166713 A1 | 7/2011 | Tsuji et al. | |
| 2011/0209929 A1 | 9/2011 | Heinzmann et al. | |
| 2011/0209932 A1 | 9/2011 | Takenaka et al. | |
| 2011/0213522 A1 | 9/2011 | Stevens et al. | |
| 2011/0233989 A1 | 9/2011 | Takenaka et al. | |
| 2011/0264350 A1 | 10/2011 | Doi | |
| 2012/0046856 A1 | 2/2012 | Doi | |
| 2012/0123647 A1 | 5/2012 | Doi et al. | |
| 2012/0166048 A1 | 6/2012 | Inoue et al. | |
| 2012/0173041 A1 | 7/2012 | Takenaka et al. | |
| 2012/0173042 A1 | 7/2012 | Takenaka et al. | |
| 2012/0173086 A1 | 7/2012 | Takenaka et al. | |
| 2012/0217072 A1 | 8/2012 | Hoffmann et al. | |
| 2012/0232757 A1 | 9/2012 | Oikawa | |
| 2013/0133959 A1 | 5/2013 | Kamiyama et al. | |
| 2013/0299254 A1 | 11/2013 | Mutoh et al. | |
| 2013/0299263 A1 | 11/2013 | Shimizu et al. | |
| 2014/0188338 A1 | 7/2014 | Ito et al. | |
| 2014/0236426 A1 | 8/2014 | Kosaka et al. | |
| 2014/0330507 A1 | 11/2014 | Oikawa | |

FOREIGN PATENT DOCUMENTS

| | | |
|---|---|---|
| EP | 1 632 428 A1 | 3/2006 |
| EP | 2 045 180 A1 | 4/2009 |
| EP | 2 052 924 A1 | 4/2009 |
| EP | 2 163 467 A1 | 3/2010 |
| EP | 2 319 750 A1 | 5/2011 |
| GB | 2 242 173 A | 9/1991 |
| GB | 2242173 A | 9/1991 |
| JP | 2004/129435 A | 4/2004 |
| JP | 4181113 B2 | 11/2008 |
| JP | 2010-167807 A | 8/2010 |
| JP | 2010-167808 A | 8/2010 |
| JP | 2011-57111 A | 3/2011 |
| JP | 2011-057111 A | 3/2011 |
| JP | 2011-63183 A | 3/2011 |
| JP | 2011/063183 A | 3/2011 |
| JP | 2011-63241 A | 3/2011 |
| JP | 2011-063241 A | 3/2011 |
| JP | 2011-63243 A | 3/2011 |
| JP | 2011-68222 A | 4/2011 |
| TW | M424290 U1 | 3/2012 |
| WO | WO 02/30730 A2 | 4/2002 |
| WO | WO 2008/132778 A1 | 11/2008 |
| WO | WO 2008/132779 A1 | 11/2008 |
| WO | WO 2010/113439 A1 | 10/2010 |
| WO | WO 2011/033575 A1 | 3/2011 |
| WO | WO 2012/017335 A1 | 2/2012 |

OTHER PUBLICATIONS

Ghorbani et al., "Fault tolerant improvement with chaos synchronization using Fuzzy-PID control", 13th Iranian Conference on Fuzzy Systems (IFSC), IEEE, 2013, 5 pages.

Jiang et al., "High Gain Disturbance Observer and Its Application in Robust Control Attenuation", Proceeding of the IEEE International Conference on Information and Automation, IEEE, Aug. 2013, pp. 230-235.

Lee et al., "Application of Dynamic Inversion with Extended High-Gain Observers to Inverted Pendulum on a Cart", 2013 American Control Conference (ACC), Jun. 17-19, 2013, AACC, 4234-4238.

Phaoharuhansa et al., "Trajectory Tracking for Wheeled Inverted Pendulum Robot using Tilt Angle Control", IEEE, 2013, pp. 4288-4293.

Yang et al., "Neural Network-Based Motion Control of Underactuated Wheeled Inverted Pendulum Models", IEEE Transactions on Neural Networks and Learning Systems, vol. 25, No. 11, Nov. 2014, pp. 2004-2016.

Zhang et al., "Variable Gain Linear Quadratic Regulator and Its Application", Proceedings of 2014 IEEE International Conference on Mechatronics and Automation, Aug. 3-6, 2014, pp. 1745-1750.

U.S. Notice of Allowance, issued Feb. 25, 2015, for U.S. Appl. No. 14/273,075.

European Office Communication for European Application No. 14161447.9, dated Jul. 23, 2015.

Extended European Search Report for Application 14169797.9 dated Oct. 7, 2014.

Extended European Search Report for Application 14169800.1 dated Oct. 7, 2014.

U.S. Office Action for U.S. Appl. No. 14/225,471, dated Oct. 1, 2015.

U.S. Office Action for U.S. Appl. No. 14/225,777, dated Oct. 5, 2015.

U.S. Office Action, dated Oct. 7, 2015, for U.S. Appl. No. 14/225,489.

U.S. Office Action, dated Oct. 9, 2015, for U.S. Appl. No. 14/246,846.

Extended European Search Report issued in corresponding EP Application No. 14169797.9 on Oct. 7, 2014 (in English).

U.S. Office Action, dated Jan. 25, 2016, for U.S. Appl. No. 14/244,279.

Notice of Allowance issued in co-pending U.S. Appl. No. 14/225,777 on Feb. 2, 2016.

\* cited by examiner

INVERTED PENDULUM TYPE VEHICLE

CROSS-REFERENCE TO RELATED APPLICATIONS

The present application claims priority under 35 USC 119 to Japanese Patent Application No. 2013-067686 filed Mar. 27, 2013 the entire contents of which are hereby incorporated by reference.

BACKGROUND OF THE INVENTION

1. Field of the Invention

The present invention relates to an inverted pendulum type vehicle configured to be capable of moving in all directions on a floor surface.

2. Description of Background Art

A technology has been proposed in which turning control for turning an inverted pendulum type vehicle around a position apart from the vehicle and lateral translation control for translating the vehicle in the lateral direction are used separately according to the magnitude of the center of gravity displacement amount in the right/left direction of the operator riding on the inverted pendulum type vehicle. See, for example, JP-A No. 2011-063241.

However, according to the technology, depending on the condition of the displacement, the vehicle may possibly turn contrary to the intention of the operator even when the operator intends to translate the inverted pendulum type vehicle in the lateral direction and displaces the center of gravity of the operator in the lateral direction.

SUMMARY AND OBJECTS OF THE INVENTION

Therefore, an object of an embodiment of the present invention is to provide an inverted pendulum type vehicle capable of improving the consistency of the intention of the operator and the motion condition of the vehicle.

According to an embodiment of the present invention, an inverted pendulum type vehicle (hereinafter a "vehicle") includes moving motion units configured to be capable of moving in all directions on a floor surface with actuator devices for driving the moving motion units. A base incorporates the moving motion units and the actuator devices. An occupant riding section is incorporated into the base so as to be tiltable with respect to the vertical direction with an inclination state detection unit being provided for detecting the inclination state of the occupant riding section. A control device is configured to control the motion of the actuator devices based on a detection result of the inclination state of the occupant riding section by the inclination state detection unit.

According to an embodiment of the present invention, the control device is configured to extract a designated frequency component of a command value or an observed value of a designated state variable determined according to the detection result of the inclination state of the occupant riding section by the inclination state detection unit and to control motion of the actuator devices so that the turning condition of the inverted pendulum type vehicle is controlled based on the extraction result of the designated frequency component.

According to an embodiment of the present invention, the command value or the observed value of the designated state variable is determined by the control device based on the detection result of the inclination state of the occupant riding section. In addition, the turning condition of the vehicle is controlled according to the presence/absence or the magnitude of the designated frequency component in the command value or the observed value of the designated state variable.

Therefore, distinction of (1A) a tilting condition of the occupant riding section achieving the vehicle turning condition matching the intention of the operator and (1B) a tilting condition of the occupant riding section leading to the vehicle turning condition contrary to the intention of the operator and the distinction of (2A) a tilting condition of the occupant riding section generating a designated frequency component in the command value and the like of the designated state variable and (2B) a tilting condition of the occupant riding section not generating a designated frequency component in the command value and the like of the designated state variable are correlated to each other, and thereby consistency of the intention of the operator and the turning condition of the vehicle is improved.

Among the tilting conditions of the occupant riding section, in addition to (1A) and (2A) that are correlated to each other and (1B) and (2B) that are correlated to each other, it is also possible that (1A) and (2B) are correlated to each other and (1B) and (2A) are correlated to each other.

According to an embodiment of the present invention, it is preferable that the control device is configured to control the motion of the actuator devices so that the turning of the vehicle is suppressed when a high frequency component is extracted as the designated frequency component.

According to an embodiment of the present invention, "the tilting condition of the occupant riding section promoting turning of the vehicle contrary to the intention of the operator (rapid change in the inclination state of the occupant riding section)" and "the tilting condition of the occupant riding section generating a high frequency component in the observed value and the like of the designated state variable" are correlated to each other. As a result, the event that the turning of the vehicle is promoted contrary to the intention of the operator is avoided, and therefore the continuity in the feel of the vehicle steering by the operator can be secured. In suppression of the turning of the vehicle, in addition to lowering either one or both of the turning angular velocity (turning rate) and the turning curvature of the vehicle, it is conceptually included to forbid turning of the vehicle and to allow only translation.

According to an embodiment of the present invention, it is preferable that the control device is configured to control motion of the actuator devices so that the turning of the vehicle is suppressed when the vehicle is being translated.

According to an embodiment of the present invention, because the event that the turning of the vehicle is promoted contrary to the intention of the operator in a situation that the probability is high that the operator intends translation of the vehicle is avoided. Thus, continuity in the feel of the vehicle steering can be secured.

According to an embodiment of the present invention, it is preferable that the control device is configured to control motion of the actuator devices so that turning of the vehicle is promoted intermittently or continuously as the moving distance after suppressing turning of the vehicle is longer.

According to an embodiment of the present invention, as the moving distance of the vehicle after suppression of turning increases, turning of the vehicle is gradually promoted. Thus, because the event that the vehicle suddenly turns contrary to the intention of the operator is avoided and continuity in the feel of the vehicle steering can be secured.

According to an embodiment of the present invention, it is preferable that the control device is configured to control motion of the actuator devices so that turning of the vehicle is promoted continuously or intermittently with a provision that the magnitude of a command value or an observed value of translational speed or turning angular velocity after suppressing turning of the vehicle has become a threshold value or more.

According to an embodiment of the present invention, when the magnitude of the translational speed or the turning angular velocity after suppressing the turning of the vehicle is high enough to become a threshold value or more, turning of the vehicle is gradually promoted. Thus, because the event that the vehicle suddenly turns contrary to the intention of the operator is avoided, continuity in vehicle steering feeling can be secured.

According to an embodiment of the present invention, it is preferable that the control device is configured to the control motion of the actuator devices using the translational speed of the vehicle with respect to the tilting direction of the occupant riding section as the designated state variable.

According to an embodiment of the present invention, by matching of (1B) a the tilting condition of the occupant riding section leading to the vehicle turning condition contrary to the intention of the operator and (2A) a tilting condition of the occupant riding section generating or increasing a designated frequency component (a high frequency component and the like) in the observed value and the like of the vehicle translational speed to each other, when the occupant riding section is tilted in the condition (2A), the event that turning of the vehicle is promoted or suppressed contrary to the intention of the operator is avoided.

According to an embodiment of the present invention, it is preferable that the control device is configured to extract the designated frequency component by making only a frequency component other than the designated frequency component of a command value or an observed value of the designated state variable pass through using a filter and deducting the frequency component other than the designated frequency component from the command value or the observed value of the designated state variable.

According to an embodiment of the present invention, while omitting the configuration of the filter and the like for directly extracting the designated frequency component from the observed value and the like of the designated state variable, the designated frequency component can be extracted by the control device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
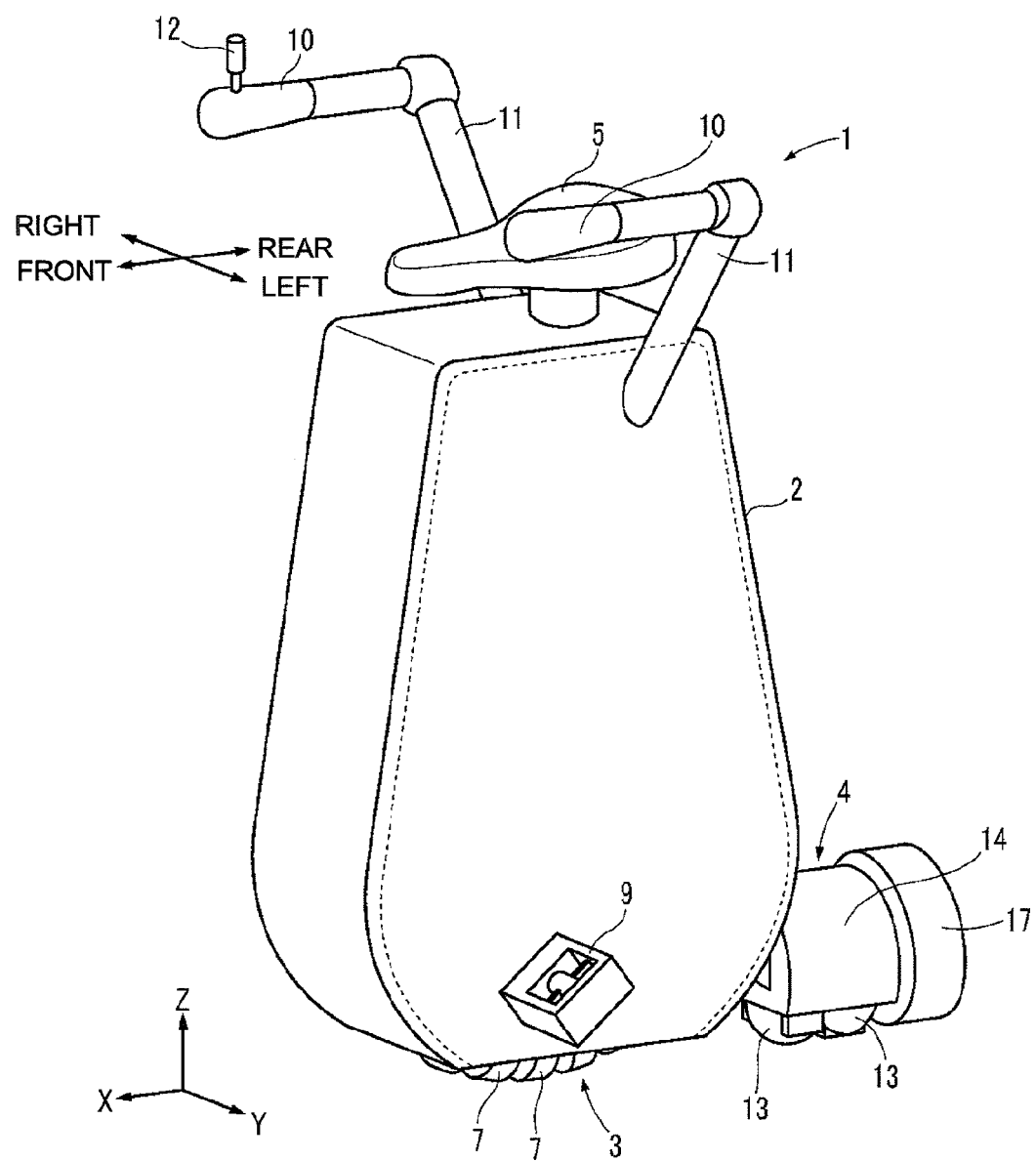
FIG. 1 is a perspective view of the outer appearance of the inverted pendulum type vehicle of the first embodiment of the present invention.
Figure 2:
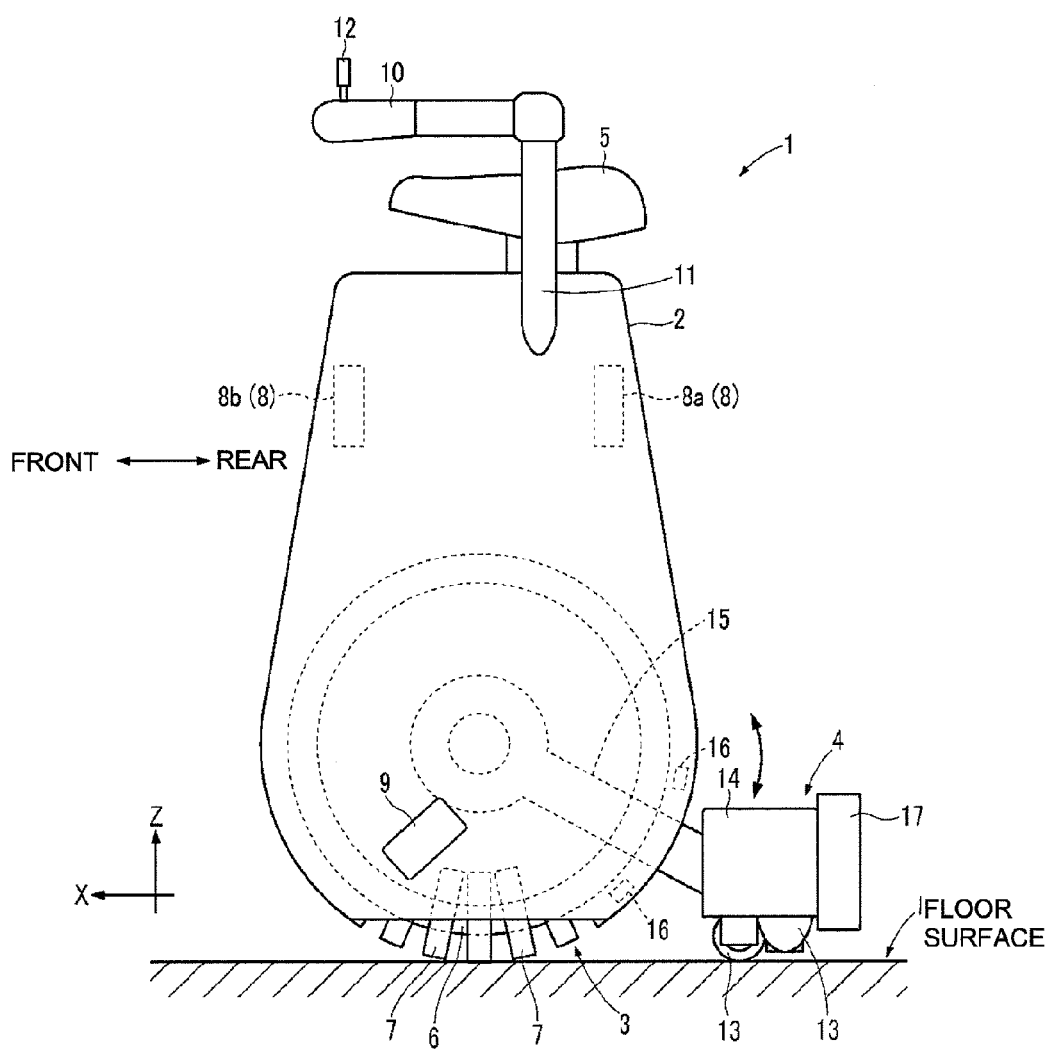
FIG. 2 is a side view of the inverted pendulum type vehicle of the first embodiment.

The first embodiment of the present invention will be described referring to FIG. 1 to FIG. 8. As shown in FIGS. 1 and 2, an inverted pendulum type vehicle 1 of the present embodiment includes a base 2, a first moving motion unit 3 and a second moving motion unit 4 capable of moving on a floor surface, and an occupant riding section 5 on which an occupant rides.

The first moving motion unit 3 includes a core body 6 of an annular shape shown in FIG. 2 (hereinafter referred to as an annular core body 6), and a plurality of rollers 7 of an annular shape mounted on the annular core body 6 so as to be arrayed at equal angular intervals in the circumferential direction (the direction around the axis) of the annular core body 6. The respective rollers 7 are externally inserted to the annular core body 6 with their axis of rotation being directed to the circumferential direction of the annular core body 6. Also, the respective rollers 7 are made rotatable integrally with the annular core body 6 around the axis of the annular core body 6, and are made rotatable around the axis of the cross section of the annular core body 6 (the circumferential axis around the axis of the annular core body 6).

The first moving motion unit 3 including these annular core body 6 and the plurality of rollers 7 is grounded on the floor surface through the roller 7 (the roller 7 positioned at the lower part of the annular core body 6) in a state where the axis of the annular core body 6 is directed parallel to the floor surface. It is configured that, by rotationally driving the annular core body 6 around the axis thereof in this grounded state, the annular core body 6 and all of the respective rollers 7 roll, and thereby the first moving motion unit 3 moves on the floor surface to the direction orthogonal to the axis of the annular core body 6. Also, it is configured that, by rotationally driving the respective rollers 7 around the rotational axes thereof in the grounded state, the first moving motion unit 3 moves to the axial direction of the annular core body 6.

Further, it is configured that, by executing rotational drive of the annular core body 6 and rotational drive of the respective rollers 7, the first moving motion unit 3 moves to the direction orthogonal to the axis of the annular core body 6 and the direction inclined with respect to the axial direction of the annular core body 6.

Thus, the first moving motion unit 3 can move to all direction on the floor surface. In the description below, as shown in FIGS. 1 and 2, out of the moving directions of the first moving motion unit 3, the direction orthogonal to the axis of the annular core body 6 is made the X-axis direction, the axial direction of the annular core body 6 is made the Y-axis direction, and the vertical direction is made the Z-axis direction. Also, the forward direction is made the positive direction of X-axis, the leftward direction is made the positive direction of Y-axis, and the upward direction is made the positive direction of Z-axis.

The first moving motion unit 3 is incorporated into the base 2. More specifically, the base 2 is arranged so as to cover the periphery of a portion excluding the lower part of the first moving motion unit 3 grounded on the floor surface. Also, the annular core body 6 of the first moving motion unit 3 is supported by the base 2 so as to be rotatable around the axis thereof.

In this case, the base 2 is made tiltable around the axis of the annular core body 6 of the first moving motion unit 3 (around Y-axis) with the axis of the annular core body 6 of the first moving motion unit 3 being a fulcrum, and is made tiltable around X-axis orthogonal to the axis of the annular core body 6 with the grounding part of the first moving motion unit 3 being a fulcrum by being tilted with respect to the floor surfaced along with the first moving motion unit 3. Therefore, the base 2 is tiltable around two axes with respect to the vertical direction.

Also, inside the base 2, as shown in FIG. 2, a first actuator device 8 that generates a drive force for moving the first moving motion unit 3 is mounted. The first actuator device 8 is formed of an electric motor 8a as an actuator rotationally driving the annular core body 6 and an electric motor 8b as an actuator rotationally driving the respective rollers 7. Further, it is configured that the electric motors 8a, 8b impart rotational drive force to the annular core body 6 and the respective rollers 7 through power transmission mechanisms whose illustrations are omitted. Also, the power transmission mechanisms may have a known structure.

The first moving motion unit 3 may have a structure different from the structure described above. For example, as the structure of the first moving motion unit 3 and the drive system thereof, those having a structure proposed by the present applicant in PCT Unexamined International Application WO/2008/132778 or PCT Unexamined International Application WO/2008/132779 may be employed.

Also, the occupant riding section 5 is incorporated into the base 2. The occupant riding section 5 is formed of a seat on which the occupant sits, and is fixed to the upper end of the base 2. Further, the occupant can sit on the occupant riding section 5 with the occupant's front/rear direction being directed to the X-axis direction and the occupant's right/left direction being directed to the Y-axis direction. Also, because the occupant riding section 5 (seat) is fixed to the base 2, it is made tiltable with respect to the vertical direction integrally with the base 2. That is, the tilting condition of the occupant riding section 5 and the tilting condition of the base 2 are measured as equivalent ones.

The first moving motion unit 3 and the base 2 may be configured so as not to be tilted around the X-axis and Y-axis (so that the attitude in the pitching direction and the rolling direction is maintained generally constant). In this case, it may be configured that the occupant riding section 5 is supported by the base 2 so as to be tiltable through a ball joint and the like. More specifically, the tilting condition of the occupant riding section 5 and the tilting condition of the base 2 are measured as separate ones.

A pair of footrests 9, 9 on which the occupant sitting on the occupant riding section 5 places the occupant's feet and a pair of holders 10, 10 held by the occupant are further incorporated into the base 2.

The footrests 9, 9 are arranged projectingly in the lower part of both sides of the base 2. Also, in FIGS. 1 and 2, an illustration of the footrest 9 on one side (right side) is omitted.

Further, the holders 10, 10 have a bar shape disposed so as to extend in the X-axis direction (front/rear direction) on both sides of the occupant riding section 5 and are respectively fixed to the base 2 through rods 11 extending from the base 2. Also, a joy stick 12 as an operation tool is attached to one holder 10 (the holder 10 on the right side in the drawing) out of the holders 10, 10.

The joy stick 12 is made swingably operable in the front/rear direction (X-axis direction) and the right/left direction (Y-axis direction). Also, the joy stick 12 outputs operation signals showing the swing amount thereof in the front/rear direction (X-axis direction) and the direction of the swing (forward or rearward) thereof as an advancing/retreating command that makes the vehicle 1 move forward or rearward, and outputs operation signals showing the swing amount in the right/left direction (Y-axis direction) and the direction of the swing (rightward or leftward) thereof as a transverse moving command that makes the vehicle 1 move in the right/left direction.

In the present embodiment, the second moving motion unit 4 is formed of a so-called omni-wheel. The omni-wheel as the second moving motion unit 4 has a known structure including a pair of coaxial annular core bodies (the illustration thereof is omitted) and a plurality of barrel-like rollers 13 externally inserted so as to be rotatable with the rotation axis being directed to the circumferential direction of the annular core bodies in the respective annular core bodies.

In this case, the second moving motion unit 4 is disposed on the rear side of the first moving motion unit 3 with the axis of the pair of annular core bodies being directed to the X-axis direction (front/rear direction), and is grounded to the floor surface through the rollers 13.

The roller 13 on one side and the roller 13 on the other side of the pair of annular core bodies are disposed so as to shift the phase in the circumferential direction of the annular core bodies, and it is configured that either one of the roller 13 on one side and the roller 13 on the other side of the pair of annular core bodies is grounded to the floor surface when the pair of annular core bodies rotate.

The second moving motion unit 4 formed of the omni-wheel is connected to the base 2. More specifically, the second moving motion unit 4 includes a case 14 that covers a portion on the upper side of the omni-wheel (the entirety of the pair of annular core bodies and the plurality of rollers 13), and the pair of annular core bodies of the omni-wheel are journaled to the case 14 so as to be rotatable around the axis of the pair of annular core bodies. Also, an arm 15 extending from the case 14 to the base 2 side is journaled to the base 2 so as to be swingable around the axis of the annular core bodies 6 of the first moving motion unit 3. Thus, the second moving motion unit 4 is connected to the base 2 through the arm 15.

Also, the second moving motion unit 4 is made swingable with respect to the base 2 around the axis of the annular core bodies 6 of the first moving motion unit 3 by swinging of the arm 15. Thereby, the occupant riding section 5 is made capable of tiltable around Y-axis along with the base 2 while both of the first moving motion unit 3 and the second moving motion unit 4 are grounded.

It may be also be configured that the arm 15 is journaled to the axis section of the annular core bodies 6 of the first moving motion unit 3 and the second moving motion unit 4 is connected to the first moving motion unit 3 through the arm 15.

Also, in the base 2, a pair of stoppers 16, 16 is arranged that restrict the swing range of the arm 15. In addition, the arm 15 can swing within a range between the stoppers 16, 16. Thus, it is configured that the swing range of the second moving motion unit 4 around the axis of the annular core bodies 6 of the first moving motion unit 3 as well as the swing range of the base 2 and the occupant riding section 5 around X-axis are restricted, and the base 2 and the occupant riding section 5 are prevented from tilting excessively to the rear side of the occupant.

The second moving motion unit 4 may be energized by a spring so as to be pressed to the floor surface.

As described above, similarly to the first moving motion unit 3, the second moving motion unit 4 can move on the floor surface in all direction including the X-axis direction and the Y-axis direction by executing either one or both of rotation of the pair of annular core bodies of the second moving motion unit 4 and rotation of the rollers 13. More specifically, the second moving motion unit 4 is made movable in the Y-axis direction (right/left direction) by rotation of the annular core bodies, and is made movable in the X-axis direction (front/rear direction) by rotation of the rollers 13.

Also, to the case 14 of the second moving motion unit 4, an electric motor 17 as the second actuator device that drives the second moving motion unit 4 is attached. So as to rotationally drive a pair of annular core bodies of the second moving motion unit 4 with the electric motor 17 being connected to the pair of annular core bodies.

Therefore, in the present embodiment, it is configured wherein the second moving motion unit 4 is moved in the X-axis direction in a subordinate manner following the movement of the first moving motion unit 3 in the X-axis direction. In addition, the second moving motion unit 4 is moved in the Y-axis direction by rotatingly driving the pair of annular core bodies of the second moving motion unit 4 by the electric motor 17.

In addition, the second moving motion unit 4 may have a structure similar to that of the first moving motion unit 3.

The above is the mechanical configuration of the vehicle 1 in the present embodiment.

Figure 3:
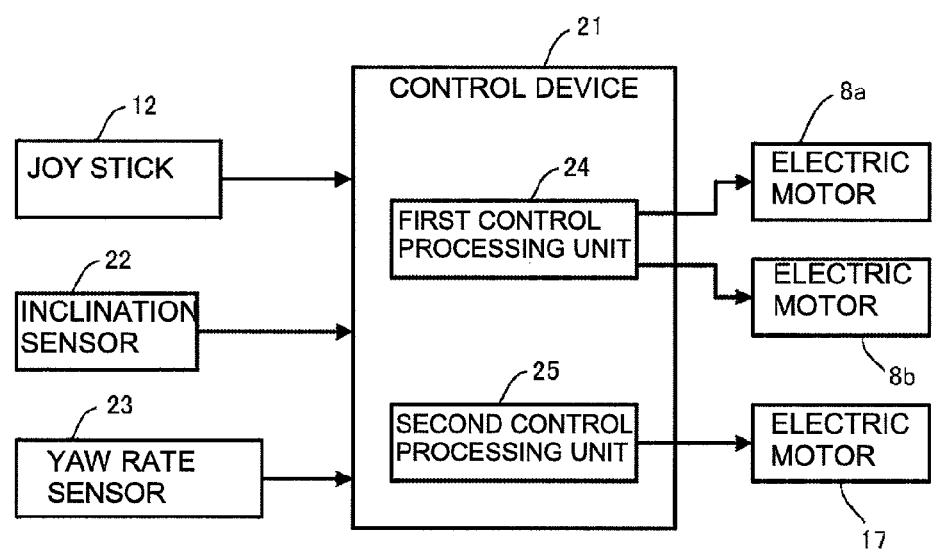
FIG. 3 is a block diagram showing a configuration for controlling the inverted pendulum type vehicle of the first embodiment.

Although the illustration in FIGS. 1 and 2 is omitted, on the base 2 of the vehicle 1 in the present embodiment, as a configuration for motion control of the vehicle 1 (motion control of the first moving motion unit 3 and the second moving motion unit 4), as shown in FIG. 3, a control device 21 formed of an electronic circuit unit including CPU, RAM, ROM and the like is mounted together with an inclination sensor 22 for measuring the inclination angle of the occupant riding section 5 (the inclination angle of the base 2) with respect to the vertical direction and a yaw rate sensor 23 for measuring the angular velocity around the yaw axis of the vehicle 1.

Also, it is configured that the output of the joy stick 12 and the detection signals of the inclination sensor 22 and the yaw rate sensor 23 are inputted to the control device 21. The input signals are stored as the data in a storage device that forms the control device 21. The data stored by the storage device may be accumulated, but may be updated or overwritten for every inputting.

The control device 21 is configured to control the actuator devices (the electric motors 8a and 8b as well as the electric motor 17) so that the turning condition of the vehicle 1 is controlled according to the detection result of the inclination state of the occupant riding section 5 expressed by the output signal of the inclination sensor 22 that forms the "inclination state detection unit."

The control device 21 is "configured" to execute predetermined calculating process means that the calculation processing device of one or a plurality of CPUs and the like forming the control device 21 is "programmed" or "designed" so as to execute the predetermined calculation process or to output required signals according to the reading software after required application software and required data are read from the storage device such as a ROM or RAM and the like.

Also, the control device 21 may be formed into a plurality of electronic circuit units that are capable of communicating with each other.

The inclination sensor 22 is formed of an acceleration sensor and an angular velocity sensor such as a gyro-sensor and the like for example. Also, the control device 21 acquires the measured value of the inclination angle of the occupant riding section 5 (that is the inclination angle of the base 2) from the detection signals of these acceleration sensor and angular velocity sensor using a known method. As the method, a method described in Japanese Patent No. 4181113 may be employed for example.

Also, more specifically, the inclination angle of the occupant riding section 5 (or the inclination angle of the base 2) in the present embodiment is the inclination angle that makes the attitude of the occupant riding section 5 (or the base 2), in a state where the center of gravity of the entirety including the vehicle 1 and the occupant riding on the occupant riding section 5 of the vehicle 1 with a predetermined attitude (standard attitude) is positioned just above (above in the vertical direction) of the grounding part of the first moving motion unit 3, a reference (zero) (a set of the inclination angle in the direction around X-axis and the inclination angle in the direction around Y-axis).

Further, the yaw rate sensor 23 is formed of an angular velocity sensor such as a gyro-sensor and the like. Also, the control device 21 acquires the measured value of the angular velocity around the yaw axis of the vehicle 1 based on the detection signal of the angular velocity sensor.

Further, the control device 21 includes a first control processing unit 24 controlling the moving motion of the first moving motion unit 3 by controlling the electric motors 8a, 8b that form the first actuator device 8 and a second control processing unit 25 controlling the moving motion of the second moving motion unit 4 by controlling the electric motor 17 as the second actuator device in addition to the function for acquiring the measured values as described above as a function achieved by a mounted program and the like (function achieved by software) or a function formed by hardware.

By executing the calculation process described below, the first control processing unit 24 calculates the first target speed that is a target value of the moving speed of the first moving motion unit 3 (more specifically, a set of the translational speed in the X-axis direction and the translational speed in the Y-axis direction) one by one, and controls the rotational speed of the electric motors 8a, 8b so that the actual moving speed of the first moving motion unit 3 agrees to the first target speed.

In this case, the relation between each rotational speed of the electric motors 8a, 8b and the actual moving speed of the first moving motion unit 3 is determined beforehand, and it is configured that the target value of the rotational speed of the electric motors 8a, 8b is decided according to the first target speed of the first moving motion unit 3. Also, by feedback-control of the rotational speed of the electric motors 8a, 8b to the target value decided according to the first target speed, the actual moving speed of the first moving motion unit 3 is controlled to the first target speed.

By executing the calculation processing described below, the second control processing unit 25 calculates the second target speed that is a target value of the moving speed of the second moving motion unit 4 (more specifically, the translational speed in the Y-axis direction) one by one, and controls the rotational speed of the electric motor 17 so that the actual moving speed of the second moving motion unit 4 in the Y-axis direction agrees to the second target speed.

In this case, similarly to the case of the first moving motion unit 3, the relation between the rotational speed of the electric motor 17 and the actual moving speed of the second moving motion unit 4 in the Y-axis direction is determined beforehand, and it is configured that the target value of the rotational speed of the electric motor 17 is decided according to the second target speed of the second moving motion unit 4. Also, by feedback-control of the rotational speed of the electric motor 17 to the target value decided according to the second target speed, the actual moving speed of the second moving motion unit 4 in the Y-axis direction is controlled to the second target speed.

In addition, in the present embodiment, the second moving motion unit 4 is moved in the X-axis direction in a subordinate manner following the movement of the first moving motion unit 3 in the X-axis direction. Therefore, it is not necessary to set the target value of the moving speed of the second moving motion unit 4 in the X-axis direction.

Next, processing of the first control processing unit 24 and the second control processing unit 25 will be described in more detail. First, processing of the first control processing unit 24 will be described referring to FIGS. 4 to 7.

Figure 4:
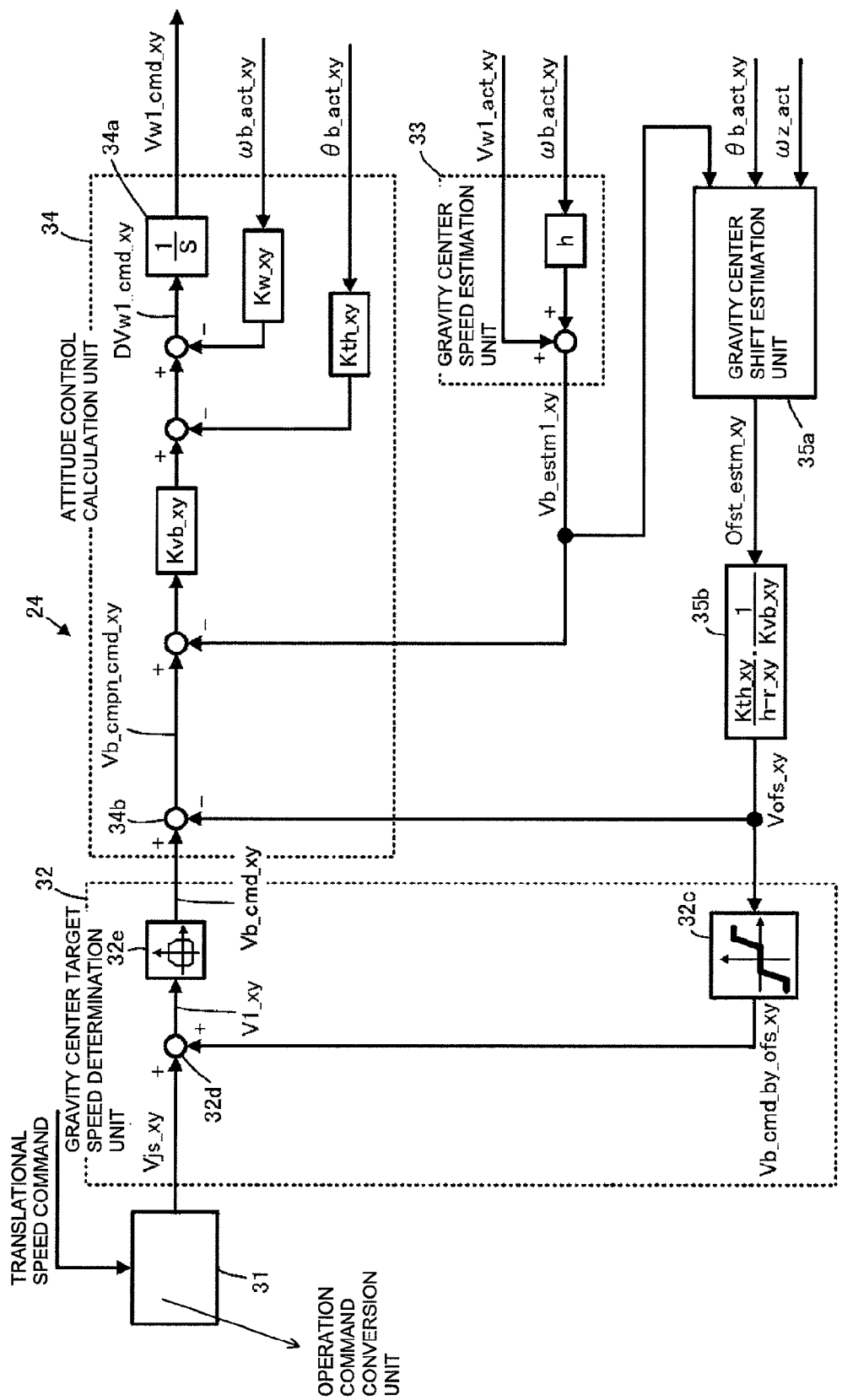
FIG. 4 is a block diagram showing processing of the first control processing unit shown in FIG. 3.

As shown in FIG. 4, the first control processing unit 24 includes, as main function units thereof, an operation command conversion unit 31 that converts the command inputted from the joy stick 12 (turning command and advancing/retreating command) to the speed command of the vehicle 1 in the X-axis direction (front/rear direction) and the Y-axis direction (right/left direction), a center of gravity target speed determination unit 32 that determines the target speed of the center of gravity of the entirety including the vehicle 1 and the occupant riding on the occupant riding section 5 thereof (hereinafter referred to as the vehicle system center of gravity of the entirety), a center of gravity speed estimation unit 33 that estimates the speed of the vehicle system center of gravity of the entirety, and an attitude control calculation unit 34 that determines the target value of the moving speed of the first moving motion unit 3 so as to control the attitude of the occupant riding section 5 (the attitude of the base 2) while making the speed of the vehicle system center of gravity of the entirety estimated follow the target speed. Also, the first control processing unit 24 executes processing of these respective function units at a predetermined calculation processing period of the control device 21.

Further, in the present embodiment, the vehicle system center of gravity of the entirety has a meaning as an example of the representative point of the vehicle 1. Therefore, the speed of the vehicle system center of gravity of the entirety means the moving speed of the representative point of the vehicle 1.

Figure 5:
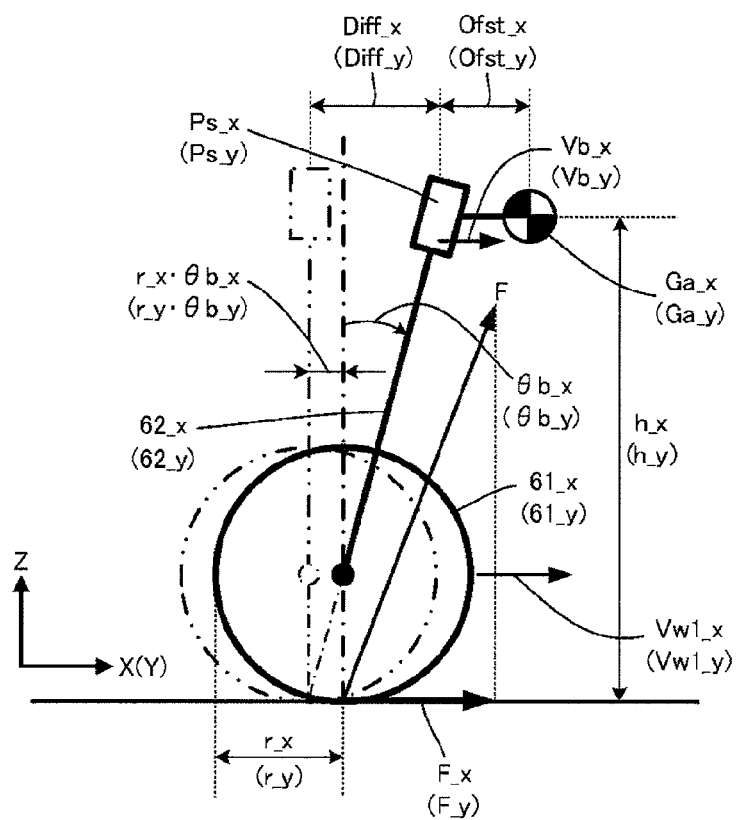
FIG. 5 is a drawing for explaining an inverted pendulum model used for processing of the first control processing unit shown in FIG. 3.

Before the processing of the respective function units of the first control processing unit 24 is described more specifically, the facts that become the base of the processing will be described. The dynamic behavior of the vehicle system center of gravity of the entirety (more specifically, the behavior as viewed in the Y-axis direction and the behavior as viewed in the X-axis direction) is approximately expressed by the behavior of an inverted pendulum model as shown in FIG. 5. The algorithm of the processing of the first control processing unit 24 is constructed on the basis of this behavior.

Also, including the reference signs in FIG. 5, in the description below, the suffix "_x" means the reference sign of the variables and the like as viewed from the Y-axis direction, and the suffix "_y" means the reference sign of the variables and the like as viewed from the X-axis direction. Further, in FIG. 5, in order to illustrate both of the inverted pendulum model as viewed from the Y-axis direction and the inverted pendulum model as viewed from the X-axis direction, the reference signs of the variables as viewed from the Y-axis direction are not in parentheses, and the reference signs of the variables as viewed from the X-axis direction are in parentheses.

The inverted pendulum model expressing the behavior of the vehicle system center of gravity of the entirety as viewed from the Y-axis direction includes an imaginary wheel 61_$x$ having the rotation axis parallel to the Y-axis direction and rollable on the floor surface (hereinafter referred to as the imaginary wheel 61_$x$), a rod 62_$x$ extending from the center of rotation of the imaginary wheel 61_$x$ and swingable around the axis of rotation of the imaginary wheel 61_$x$ (in the direction around Y-axis), and a mass point Ga_x connected to a reference Ps_x that is the distal end (upper end) of the rod 62_$x$.

In the inverted pendulum model, the motion of the mass point Ga_x is equivalent to the motion of the vehicle system center of gravity of the entirety as viewed from the Y-axis direction, and the inclination angle θb_x (the inclination angle in the direction around Y-axis) of the rod 62_$x$ with respect to the vertical direction agrees to the inclination angle in the direction around the Y-axis of the occupant riding section 5 (or the base 2). Also, the translational motion in the X-axis direction of the first moving motion unit 3 is equivalent to the translational motion in the X-axis direction caused by rolling of the imaginary wheel 61_$x$.

Further, the radius r_x of the imaginary wheel 61_$x$ and the height h_x of the reference Ps_x and the mass point Ga_x from the floor surface are made preset values (constant values) that are set beforehand. Also, in other words, r_x is equivalent to the height of the center of tilting of the occupant riding section 5 (or the base 2) in the direction around −Y-axis from the floor surface. In the present embodiment, this r_x is equivalent to the distance between the axis of the annular core bodies 6 of the first moving motion unit 3 and the grounding surface.

In a similar manner, the inverted pendulum model expressing the behavior of the vehicle system center of gravity of the entirety as viewed from the X-axis direction includes an imaginary wheel 61_$y$ having the axis of rotation parallel to the X-axis direction and rollable on the floor surface (hereinafter referred to as the imaginary wheel 61_$y$), a rod 62_$y$ extending from the rotation center of the imaginary wheel 61_$y$ and swingable around the rotation axis of the imaginary wheel 61_$y$ (in the direction around X-axis), and a mass point Ga_y connected to a reference Ps_y that is the distal end (upper end) of the rod 62_$y$.

In the inverted pendulum model, the motion of the mass point Ga_y is equivalent to the motion of the vehicle system center of gravity of the entirety as viewed from the X-axis direction, and the inclination angle θb_y (the inclination angle in the direction around X-axis) of the rod 62_$y$ with respect to the vertical direction agrees to the inclination angle in the direction around X-axis of the occupant riding section 5 (or the base 2). Also, the translational motion in the Y-axis direction of the first moving motion unit 3 is equivalent to the translational motion in the Y-axis direction caused by rolling of the imaginary wheel 61_$y$.

Further, the radius r_y of the imaginary wheel 61_$y$ and the height h_y of the reference Ps_y and the mass point Ga_y from the floor surface are made preset values (constant values) that are set beforehand. Also, in other words, r_y is equivalent to the height of the center of tilting of the occupant riding section 5 (or the base 2) in the direction around X-axis from the floor surface. In the present embodiment, this r_y is equivalent to the radius of the rollers 7 of the first moving motion unit 3. Also, the height h_y of the reference Ps_y and the mass point Ga_y as viewed from the X-axis direction from the floor surface is the same as the height h_x of the reference Ps_x and the mass point Ga_x as viewed from the Y-axis direction from the floor surface. Therefore, h_x=h_y=h is to be hereinafter noted.

A comment will be added on the positional relation between the reference Ps_x and the mass point Ga_x as viewed from the Y-axis direction. The position of the reference Ps_x is equivalent to the position of the vehicle system center of gravity of the entirety in a case where the occupant riding (sitting on) the occupant riding section 5 is assumed to be immobile with respect to the occupant riding section 5. Therefore, in this case, the position of the mass point Ga_x agrees to the position of the reference. Ps_x. This is similar also with respect to the positional relation between the reference Ps_y and the mass point Ga_y as viewed from the X-axis direction.

However, in fact, an occupant riding on the occupant riding section 5 moves the upper body and the like thereof with respect to the occupant riding section 5 (or the base 2), and thereby the position in the X-axis direction and the position in the Y-axis direction of the actual vehicle system center of gravity of the entirety come to be shifted to the lateral direction respectively from the positions of the reference Ps_x, Ps_y in general. Therefore, in FIG. 5, the positions of the mass points Ga_x, Ga_y are illustrated in a state shifted respectively from the positions of the reference Ps_x, Ps_y.

The behavior of the vehicle system center of gravity of the entirety expressed by the inverted pendulum model as described above is expressed by expressions (1a), (1b), (2a), (2b) below. In this case, the expressions (1a), (1b) express the behavior as viewed in the Y-axis direction, and the expressions (2a), (2b) express the behavior as viewed in the X-axis direction.

$$Vb\_x = Vw1\_x + h\_x \cdot \omega b\_x \tag{1a}$$

$$dVb\_x/dt = (g/h) \cdot (\theta b\_x \cdot (h - r\_x) + Ofst\_x) + \omega z \cdot Vb\_y \tag{1b}$$

$$Vb\_y = Vw1\_y + h\_y \cdot \omega b\_y \tag{2a}$$

$$dVb\_y/dt = (g/h) \cdot (\theta b\_y \cdot (h - r\_y) + Ofst\_y) - \omega z \cdot Vb\_x \tag{2b}$$

Vb_x is the speed (translational speed) in the X-axis direction of the vehicle system center of gravity of the entirety, Vw1_x is the moving speed (translational speed) in the X-axis direction of the imaginary wheel 61_x, θb_x is the inclination angle in the direction around Y-axis of the occupant riding section 5 (or the base 2), ωb_x is the temporal change rate of θb_x (=dθb_x/dt), Ofst_x is the shift amount in the X-axis direction of the position in the X-axis direction of the vehicle system center of gravity of the entirety (the position in the X-axis direction of the mass point Ga_x) from the position of the reference Ps_x, Vb_y is the speed (translational speed) in the Y-axis direction of the vehicle system center of gravity of the entirety, Vw1_y is the moving speed (translational speed) in the Y-axis direction of the imaginary wheel 61_y, θb_y is the inclination angle in the X-axis direction of the occupant riding section 5 (or the base 2), ωb_y is the temporal change rate of θb_y (=dθb_y/dt), and Ofst_y is the shift amount in the Y-axis direction of the position in the Y-axis direction of the vehicle system center of gravity of the entirety (the position in the Y-axis direction of the mass point Ga_y) from the position of the reference Ps_y.

Also, ωz is the yaw rate (the angular velocity in the direction around the yaw axis) when the vehicle 1 turns, and g is the gravitational acceleration constant.

Further, the positive direction of θb_x, ωb_x is the direction that the vehicle system center of gravity of the entirety inclines to the positive direction of X-axis (forward), and the positive direction of θb_y, ωb_y is the direction that the vehicle system center of gravity of the entirety inclines to the positive direction of Y-axis (leftward).

Furthermore, the positive direction of ωz is the counterclockwise direction when the vehicle 1 is viewed from above.

Also, Vb_x, Vb_y agree to the moving speed in the X-axis direction of the reference Ps_x and the moving speed in the Y-axis direction of the reference Ps_y, respectively.

The second term of the right side of the expression (1a) (=h·ωb_x) is the translational speed component in the X-axis direction of the reference Ps_x generated by tilting of the occupant riding section 5 in the direction around Y-axis, and the second term of the right side of the expression (2a) (=h·b_y) is the translational speed component in the Y-axis direction of the reference Ps_y generated by tilting of the occupant riding section 5 in the direction around −X-axis.

In addition, more specifically, Vw1_x in the expression (1a) is the relative circumferential speed of the imaginary wheel 61_x with respect to the rod 62_x (in other words, with respect to the occupant riding section 5 or the base 2). Therefore, in Vw1_x, in addition to the moving speed in the X-axis direction of the grounding point of the imaginary wheel 61_x to the floor surface (the moving speed in the X-axis direction of the grounding point of the first moving motion unit 3 to the floor surface), a velocity component accompanying tilting of the rod 62_x (=r_x·ωb_x) is included. This fact is also similar to Vw1_y in the expression (1b).

Also, the first term of the right side of the expression (1b) is the acceleration component in the X-axis direction generated in the vehicle system center of gravity of the entirety by the component in the X-axis direction (F_x in FIG. 5) of the floor reaction force (F in FIG. 5) applied to the grounding part of the imaginary wheel 61_x according to the shift amount (=θb_x·(h−r_x)+Ofst_x) of the position in the X-axis direction of the vehicle system center of gravity of the entirety (the position in the X-axis direction of the mass point Ga_x) from the upper position in the vertical direction of the grounding part of the imaginary wheel 61_x (the grounding part of the first moving motion unit 3 as viewed in the Y-axis direction), and the second term of the right side of the expression (1b) is the acceleration component in the X-axis direction generated by the centrifugal force applied to the vehicle 1 in turning at the yaw rate of ωz.

Similarly, the first term of the right side of the expression (2b) is the acceleration component in the Y-axis direction generated in the vehicle system center of gravity of the entirety by the component in the Y-axis direction (F_y in FIG. 5) of the floor reaction force (F in FIG. 5) applied to the grounding part of the imaginary wheel 61_y according to the shift amount (=θb_y·(h−r_y)+Ofst_y) of the position in the Y-axis direction of the vehicle system center of gravity of the entirety (the position in the Y-axis direction of the mass point Ga_y) from the upper position in the vertical direction of the grounding part of the imaginary wheel 61_y (the grounding part of the first moving motion unit 3 as viewed in the X-axis direction), and the second term of the right side of the expression (2b) is the acceleration component in the Y-axis direction generated by the centrifugal force applied to the vehicle 1 in turning at the yaw rate of ωz.

Figure 6:
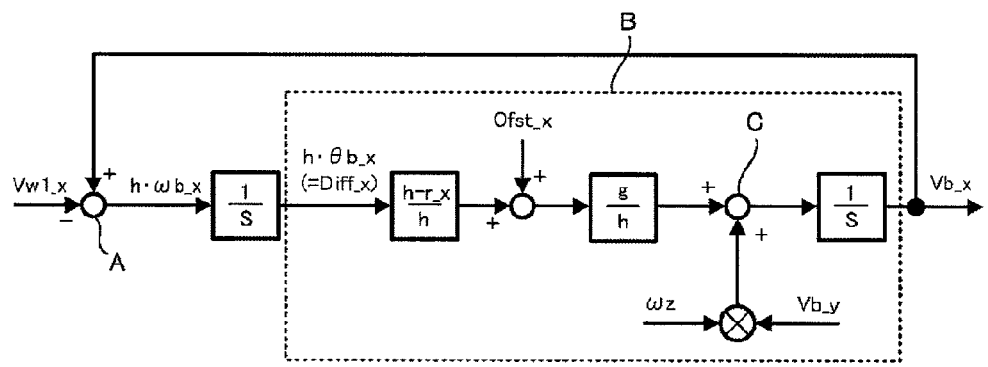
FIG. 6 is a block diagram showing a behavior in relation with the inverted pendulum model of FIG. 5.

As described above, the behavior expressed by the expressions (1a), (1b) (the behavior as viewed in the X-axis direction) is expressed as shown in FIG. 6 when expressed by a block diagram. 1/s in the drawing expresses integral calculation.

Also, processing of the calculation unit marked with the reference sign A in FIG. 6 corresponds to the relation formula of the expression (1a), and processing of the calculation unit marked with the reference sign B corresponds to the relation formula of the expression (1b).

Further, h·θb_x in FIG. 6 approximately agrees to Diff_x shown in FIG. 5.

On the other hand, the block diagram that expresses the behavior expressed by the expressions (2a), (2b) (the behavior as viewed in the Y-axis direction) is obtained by substituting "_y" for the suffixes "_x" in FIG. 6 and substituting "−" for the marks "+" of the acceleration component (the acceleration component generated by the centrifugal force) on the lower side in the drawing that is one of the inputs to the adder marked with the reference sign C.

In the present embodiment, as described above, the algorithm of processing of the first control processing unit 24 is constructed based on a behavior model of the vehicle system center of gravity of the entirety (inverted pendulum model) that takes the shift amount of the vehicle system center of gravity of the entirety from the references Ps_x, Ps_y and the centrifugal force into consideration.

On the premise of the above, processing of the first control processing unit 24 will be described more specifically. Also, in the description below, a set of a value of a variable in relation with the behavior as viewed from the Y-axis direction and a value of a variable in relation with the behavior as viewed from the X-axis direction may be expressed adding the suffix "_xy".

As illustrated in FIG. 4, at each calculation processing period of the control device 21, the first control processing unit 24 executes processing of the operation command conversion unit 31 and processing of the center of gravity speed estimation unit 33 first.

The operation command conversion unit 31 determines a basic speed command Vjs_xy that is a basic command value of the moving speed (translational speed) of the first moving motion unit 3 according to an advancing/retreating command given by the joy stick 12 (an operation signal showing the swing amount in the X-axis direction of the joy stick 12 and the direction of the swing thereof) or a transverse moving command (an operation signal showing the swing amount in the Y-axis direction of the joy stick 12 and the direction of the swing thereof).

In this case, out of the basic speed command Vjs_xy, the basic speed command Vjs_x in the X-axis direction is determined according to the advancing/retreating command. More specifically, when the swing amount of the joy stick 12 shown by the advancing/retreating command is a swing amount toward the front, the basic speed command Vjs_x in the X-axis direction is made the speed command for the advancing direction of the vehicle 1, and, when the swing amount of the joy stick 12 is a swing amount toward the rear, the basic speed command Vjs_x in the X-axis direction is made the speed command for the retreating direction of the vehicle 1. Also, in this case, the magnitude of the basic speed command Vjs_x in the X-axis direction is determined so as to increase in the range of a predetermined upper limit value or below as the swing amount of the joy stick 12 to the front side or the rear side increases.

Further, a predetermined range where the swing amount of the joy stick 12 to the front side or the rear side becomes minute enough is made a dead zone, and it may be configured that the basic speed command Vjs_x in the X-axis direction is set to zero for the swing amount within the dead zone.

Also, out of the basic speed command Vjs_xy, the basic speed command Vjs_y in the Y-axis direction is determined according to the transverse moving command. More specifically, when the swing amount of the joy stick 12 shown by the transverse moving command is a swing amount toward the right, the basic speed command Vjs_y in the Y-axis direction is made the speed command toward the right of the vehicle 1, and, when the swing amount of the joy stick 12 is a swing amount toward the left side, the basic speed command Vjs_y in the Y-axis direction is made the speed command toward the left of the vehicle 1. In this case, the magnitude of the basic speed command Vjs_y in the Y-axis direction is determined so as to increase in the range of a predetermined upper limit value or below as the swing amount of the joy stick 12 toward the right or toward the left increases.

Further, with respect to the magnitude of the basic speed command Vjs_y, a predetermined range where the swing amount of the joy stick 12 toward the right or toward the left becomes minute enough is made a dead zone, and it may be configured that the basic speed command Vjs_y in the Y-axis direction is set to zero for the swing amount within the dead zone.

Also, when the joy stick 12 is operated in both of the front/rear direction (X-axis direction) and the right/left direction (Y-axis direction), the magnitude of the basic speed command Vjs_y in the Y-axis direction may be changed according to the swing amount of the joy stick 12 in the front/rear direction or the basic speed command Vjs_x in the X-axis direction.

The center of gravity speed estimation unit 33 calculates an estimate value Vb_estm1_xy of the speed of the vehicle system center of gravity of the entirety based on a geometric (kinematic) relation formula expressed by the expressions (1a), (2a) in the inverted pendulum model.

More specifically, as shown in the block diagram of FIG. 4, the estimate value Vb_estm1_xy of the speed of the vehicle system center of gravity of the entirety is calculated by adding a value of the actual translational speed Vw1_act_xy of the first moving motion unit 3 and a value obtained by multiplying the actual temporal change rate ωb_act_xy of the inclination angle θb_xy (inclination angular velocity) of the occupant riding section 5 by the height h of the vehicle system center of gravity of the entirety.

More specifically, the estimate value Vb_estm1_x of the speed in the X-axis direction and the estimate value Vb_estm1_y of the speed in the Y-axis direction of the vehicle system center of gravity of the entirety are calculated respectively by expressions (3a), (3b) below.

$$Vb\_estm1\_x = Vw1\_act\_x + h \cdot \omega b\_act\_x \quad (3a)$$

$$Vb\_estm1\_y = Vw1\_act\_y + h \cdot \omega b\_act\_y \quad (3b)$$

However, the temporal change rate of the shift amount Ofst_xy of the position of the vehicle system center of gravity of the entirety from the position of the reference Ps_xy (hereinafter referred to as a center of gravity shift amount Ofst_xy) was assumed to be small enough compared to Vb_estm1_xy and negligible.

In this case, for the values of Vw1_act_x, Vw1_act_y in the calculation above, in the present embodiment, target values Vw1_cmd_x, Vw1_cmd_y (values of the last time) of the moving speed of the first moving motion unit 3 determined by the attitude control calculation unit 34 at the last calculation processing period are used.

However, it may be configured for example that each rotational speed of the electric motors 8a, 8b is detected by a rotational speed sensor such as a rotary encoder and the like and newest values of Vw1_act_x, Vw1_act_y estimated from these estimate values (in other words, newest values of the measured values of Vw1_act_x, Vw1_act_y) are used for calculation of the expressions (3a), (3b).

Also, for the values of ωb_act_x, ωb_act_y, in the present embodiment, the newest values of the temporal change rate of the measured value of the inclination angle θb of the occupant riding section 5 based on the detection signal of the inclination sensor 22 (in other words, newest values of the measured values of ωb_act_x, ωb_act_y) are used.

The first control processing unit 24 determines a center of gravity shift amount estimate value Ofst_estm_xy that is the estimate value of the center of gravity shift amount Ofst_xy by executing processing of the operation command conversion unit 31 and the center of gravity speed estimation unit 33 as described above and thereafter executing processing of a center of gravity shift estimation unit 35a shown in FIG. 4.

Figure 7:
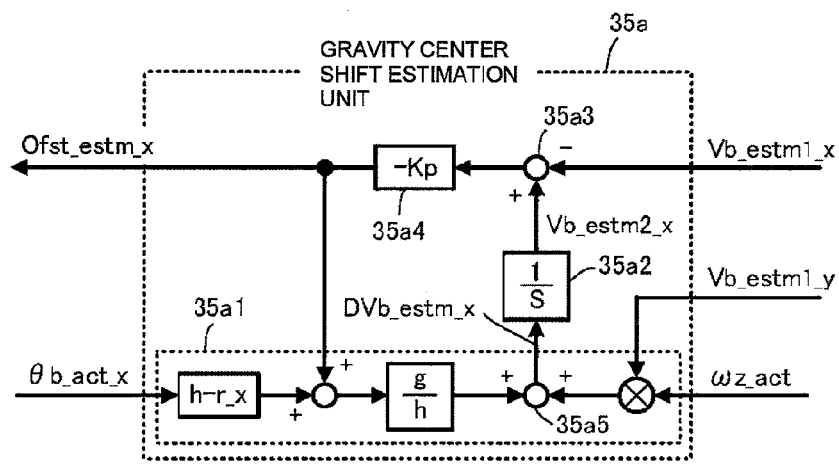
FIG. 7 is a block diagram showing processing of a center of gravity shift estimation unit shown in FIG. 4.

Processing of this center of gravity shift estimation unit 35a is processing shown by the block diagram of FIG. 7. Also, FIG. 7 typically shows the determining process of the center of gravity shift amount estimate value Ofst_estm_x in the X-axis direction out of the center of gravity shift amount estimate value Ofst_estm_xy. The estimate value of the right/left direction center of gravity of the entirety shift amount can be calculated one by one by calculation shown in the block diagram of FIG. 7, for example. In the description below, the first estimate values Vb_estm1_x and Vb_estm1_y means the estimate values Vb_estm1_x and Vb_estm1_y of the speed of the vehicle system center of gravity of the entirety calculated by the center of gravity speed estimation unit 33, respectively.

More specifically, by multiplying deviations of the moving speed in the right/left direction of the center of gravity of the entirety of the vehicle and the occupant (may be hereinafter referred to as the vehicle system center of gravity of the entirety) from the first estimate value Vb_estm1_y and the second estimate value Vb_estm2_y by a gain of a predetermined value determined beforehand, the estimate value of the right/left direction center of gravity of the entirety shift amount can be determined one by one so as to converge to the actual value.

The first estimate value Vb_estm1_y is an estimate value of the moving speed in the right/left direction of the vehicle system center of gravity of the entirety kinematically calculated by an expression (A) below. The second estimate value Vb_estm2_y is an estimate value of the moving speed calculated by integrating the movement acceleration Dvb_estm2_y in the right/left direction of the vehicle system center of gravity of the entirety dynamically calculated by expression (B) below.

$$Vb\_estm1\_y = Vw1\_act\_y + h \cdot \omega b\_act\_y \quad (A)$$

$$Dvb\_estm\_y = (\theta b\_act\_y \cdot (h-r\_y) + Ofst\_estm\_y(k-1)) \cdot (g/h) + Vb\_estm1\_x \cdot \omega z\_act \quad (B)$$

In the expressions above:
Vw1_act_y is the observed value of the moving speed in the right/left direction of the first moving motion unit,
H is the value determined beforehand as the height of the vehicle system center of gravity of the entirety from the floor surface,
ωb_act_y is the observed value of the angular velocity of tilting of the occupant riding section in the direction around the axis in the front/rear direction, θb_act_y is the observed value of the inclination angle in the direction around the axis in the front/rear direction (the inclination angle with respect to the vertical direction) of the occupant riding section,
r_y is the height of the center of tilting of the occupant riding section in the direction around the axis in the front/rear direction from the floor surface,
Ofst_estm_y(k−1) is the newest value out of the estimated values of the right/left direction entirety center of gravity shift amount having been calculated already,
G is the gravity acceleration constant,
Vb_estm1_x is the estimate value of the moving speed in the right/left direction of the vehicle system center of gravity of the entirety calculated by expression (C) below, $$Vb\_estm1\_x = Vw1\_act\_x + h \cdot \omega b\_act\_x \quad (C)$$

Vw1_act_x is the observed value of the moving speed in the front/rear direction of the first moving motion unit,
ωb_act_x is the observed value of the angular velocity of tilting of the occupant riding section in the direction around the axis in the right/left direction, and
ωz_act is the angular velocity of the vehicle in the direction around the yaw axis.

The "observed value" in relation with an optional quantity of state such as the moving speed and the like means a detection value of the quantity of state detected by an appropriate sensor, or an estimate value estimated based on the correlation from a detection value of another one or more of the quantity of state having a constant correlation with the quantity of state.

Processing of FIG. 7 will be described specifically. The center of gravity shift estimation unit 35a calculates the estimate value DVb_estm_x of the translational acceleration in the X-axis direction of the vehicle system center of gravity of the entirety by executing calculation processing of the right side of the expression (1b) by a calculation unit 35a1 using the measured value (newest value) of the actual inclination angle θb_act_x of the occupant riding section 5 in the direction around Y-axis obtained from the detection signal of the inclination sensor 22, the measured value (newest value) of the actual Yaw rate ωz_act of the vehicle 1 obtained from the detection signal of the yaw rate sensor 23, the first estimate value Vb_estm1_y (newest value) of the speed of the vehicle system center of gravity of the entirety in the Y-axis direction calculated by the center of gravity speed estimation unit 33, and the center of gravity shift amount estimate value Ofst_estm_x (the value of the last time) in the X-axis direction determined at the calculation processing period of the last time.

Also the center of gravity shift estimation unit 35a calculates the second estimate value Vb_estm2_x of the speed of the vehicle system center of gravity of the entirety in the X axis direction by executing processing of integrating the estimate value DVb_estm_x of the translational acceleration in the X-axis direction of the vehicle system center of gravity of the entirety by a calculation unit 35a2.

Next, the center of gravity shift estimation unit 35a executes processing of calculating the deviation of the second estimate value Vb_estm2_x (newest value) of the speed of the vehicle system center of gravity of the entirety in the X-axis direction and the first estimate value Vb_estm1_x (the newest value) by a calculation unit 35a3.

Further, the center of gravity shift estimation unit 35a determines the newest value of the center of gravity shift amount estimate value Ofst_estm_x in the X-axis direction by executing processing of multiplying this deviation by a predetermined gain (−Kp) by a calculation unit 35a4.

Determining processing of the center of gravity shift amount estimate value Ofst_estm_y in the Y-axis direction is also executed similarly to the above. More specifically, the block diagram that shows this determining processing is obtained by replacing the suffixes "_x" and "_y" in FIG. 7 with each other and substituting "−" for the marks "+" of the acceleration component (the acceleration component generated by the centrifugal force) on the right side in the drawing that is one of the inputs to an adder 35a5.

By such processing of the center of gravity shift estimation unit 35a, Ofst_estm_xy can be determined so as to converge to an actual value by determining the center of gravity shift amount estimate value Ofst_estm_xy while updating it one by one.

Next, the first control processing unit 24 calculates the center of gravity shift effect amount Vofs_xy by executing processing of a center of gravity shift effect amount calculation unit 35b shown in FIG. 4.

The center of gravity shift effect amount Vofs_xy expresses the shift of the actual center of gravity speed with respect to the target speed of the vehicle system center of gravity of the entirety when feedback-control is executed in the attitude control calculation unit 34 described below without taking that the position of the vehicle system center of gravity of the entirety shifts from the position of the reference Ps_xy in the inverted pendulum model into consideration.

More specifically, this center of gravity shift effect amount calculation unit 35b calculates the center of gravity shift effect amount Vofs_xy by multiplying each component of the newly determined center of gravity shift amount estimate value Ofst_estm_xy by a value of (Kth_xy/(h−r_xy))/Kvb_xy.

Also, Kth_xy is a gain value for determining a manipulated variable component that functions so as to bring the inclination angle of the occupant riding section 5 close to zero (target inclination angle) in processing of the attitude control calculation unit 34 described below. Further, Kvb_xy is a gain value for determining a manipulated variable component that functions so as to bring the deviation of the target speed Vb_cmd_xy of the vehicle system center of gravity of the entirety and the first estimate value Vb_estm1_xy of the speed of the vehicle system center of gravity of the entirety close to zero in processing of the attitude control calculation unit 34 described below.

Next, the first control processing unit 24 calculates a post-restriction center of gravity target speed Vb_cmd_xy based on the basic speed command Vjs_xy determined by the operation command conversion unit 31 and the center of gravity shift effect amount Vofs_xy determined by the center of gravity shift effect amount calculation unit 35b by executing processing of the center of gravity target speed determination unit 32 shown in FIG. 4.

First, the center of gravity target speed determination unit 32 executes processing of a processing unit 32c shown in FIG. 4. This processing unit 32c determines a target center of gravity speed adding amount Vb_cmd_by_ofs_xy as a component according to the shift of the center of gravity out of the target value of the speed of the vehicle system center of gravity of the entirety by executing dead zone processing and limiting processing in relation with the value of the center of gravity shift effect amount Vofs_xy.

More specifically, in the present embodiment, when the magnitude of the center of gravity shift effect amount Vofs_xy in the X-axis direction is a value within the dead zone that is a predetermined range in the vicinity of zero (a value comparatively near to zero), the center of gravity target speed determination unit 32 makes the target center of gravity speed adding amount Vb_cmd_by_ofs_xy in the X-axis direction zero.

Also, when the magnitude of the center of gravity shift effect amount Vofs_x in the X-axis direction is a value deviated from the dead zone, the center of gravity target speed determination unit 32 determines the target center of gravity speed adding amount Vb_cmd_by_ofs_x in the X-axis direction to be of a polarity same as that of Vofs_x and so that the magnitude thereof increases as the magnitude of Vofs_x increases. However, the value of the target center of gravity speed adding amount Vb_cmd_by_ofs_x is restricted to the range between predetermined upper limit value (>0) and lower limit value (≤0).

The determining process of the target center of gravity speed adding amount Vb_cmd_by_ofs_y in the Y-axis direction is also similar to the above.

Next, the center of gravity target speed determination unit 32 executes processing for determining the target speed V1_xy that is obtained by adding each component of the target center of gravity speed adding amount Vb_cmd_by_ofs_xy to each component of the basic speed command Vjs_xy which is determined by the operation command conversion unit 31 by a processing unit 32d shown in FIG. 4. That is, V1_xy (a set of V1_x and V1_y) is determined by processing of V1_x=Vjs_x+Vb_cmd_by_ofs_x, V1_y=Vjs_y+Vb_cmd_by_ofs_y.

Further, the center of gravity target speed determination unit 32 executes processing of a processing unit 32e. This processing unit 32e executes limiting processing for determining the post-restriction center of gravity target speed Vb_cmd_xy (a set of Vb_cmd_x and Vb_cmd_y) as the target speed of the vehicle system center of gravity of the entirety obtained by restricting the combination of the target speed V1_x and V1_y in order that each rotational speed of the electric motor 8a, 8b as the actuator device 8 of the first moving motion unit 3 does not deviate from a predetermined allowable range.

In this case, when a set of the target speeds V1_x and V1_y obtained by the processing unit 32d exists within a predetermined region on a coordination system with the value of the target speed V1_x on the axis of ordinates and with the value of the target speed V1_y on the axis of abscissas (the region of the octagonal shape for example), the target speed V1_xy is determined as the post-restriction center of gravity target speed Vb_cmd_xy as it is.

Also when a set of the target speeds V1_x and V1_y obtained by the processing unit 32d deviates from the predetermined region on the coordination system, one restricted to a set on the boundary of the predetermined region is determined as the post-restriction center of gravity target speed Vb_cmd_xy.

As described above, because the center of gravity target speed Vb_cmd_xy is determined based on the basic speed command Vjs_xy and the center of gravity shift effect amount Vofs_xy (or the center of gravity shift amount), the occupant can steer the vehicle 1 by operation of the controller (operation of the joy stick 12) and by change of the attitude of the body of the occupant (movement of the body weight).

After executing processing of the center of gravity target speed determination unit 32 as described above, next, the first control processing unit 24 executes processing of the attitude control calculation unit 34. The attitude control calculation unit 34 determines the first target speed Vw1_cmd_xy that is the target value of the moving speed (translational speed) of the first moving motion unit 3 by processing shown in the block diagram of FIG. 4.

More specifically, first, the attitude control calculation unit 34 determines the target speed after center of gravity shift compensation Vb_cmpn_cmd_xy (newest value) by executing processing of reducing each component of the center of gravity shift effect amount Vofs_xy by a calculation unit 34b from each component of the post-restriction center of gravity target speed Vb_cmd_xy.

Next, the attitude control calculation unit 34 calculates the target translational acceleration DVw1_cmd_x in the X-axis direction and the target translational acceleration DVw1_cmd_y in the Y-axis direction out of the target translational acceleration DVw1_cmd_xy that is the target value of the translational acceleration of the grounding point of the first moving motion unit 3 by processing of the calculation unit 34b and the calculation units excluding an integration calculation unit 34a that executes integration calculation by calculation of expressions (4a), (4b) below, respectively.

$$DVw1\_cmd\_x = Kvb\_x \cdot (Vb\_cmpn\_cmd\_x - Vb\_estm1\_x) - Kth\_x \cdot \theta b\_act\_x - Kw\_x \cdot \omega b\_act\_x \quad (4a)$$

$$DVw1\_cmd\_y = Kvb\_y \cdot (Vb\_cmpn\_cmd\_y - Vb\_estm1\_y) - Kth\_y \cdot \theta b\_act\_y - Kw\_y \cdot \omega b\_act\_y \quad (4b)$$

Kvb_xy, Kth_xy, Kw_xy in the expressions (4a), (4b) are predetermined gain values that are set beforehand.

Also, the first term of the right side of the expression (4a) is a feedback manipulated variable component according to the deviation of the target speed after center of gravity shift compensation Vb_cmpn_cmd_x (newest value) in the X-axis direction of the vehicle system center of gravity of the entirety and the first estimate value Vb_estm1_x (newest value), the second term is a feedback manipulated variable component according to the measured value (newest value) of the actual inclination angle $\theta b\_act\_x$ in the direction around Y-axis of the occupant riding section 5, and the third term is a feedback manipulated variable component according to the measured value (newest value) of the actual inclination angular velocity $\omega b\_act\_x$ in the direction around Y-axis of the occupant riding section 5. Further, the target translational acceleration DVw1_cmd_x in the X-axis direction is calculated as a combined manipulated variable of these feedback manipulated variable components.

Similarly, the first term of the right side of the expression (4b) is a feedback manipulated variable component according to the deviation of the target speed after center of gravity shift compensation Vb_cmpn_cmd_y (newest value) in the Y-axis direction of the vehicle system center of gravity of the entirety and the first estimate value Vb_estm1_y (newest value), the second term is a feedback manipulated variable component according to the measured value (newest value) of the actual inclination angle $\theta b\_act\_y$ in the direction around X-axis of the occupant riding section 5, and the third term is a feedback manipulated variable component according to the measured value (newest value) of the actual inclination angular velocity $\omega b\_act\_y$ in the direction around X-axis of the occupant riding section 5. Further, the target translational acceleration DVw1_cmd_y in the Y-axis direction is calculated as a combined manipulated variable of these feedback manipulated variable components.

Next, the attitude control calculation unit 34 determines the first target speed Vw1_cmd_xy (newest value) of the first moving motion unit 3 by integrating each component of the target translational acceleration DVw1_cmd_xy by the integration calculation unit 34a.

Also, the first control processing unit 24 controls the electric motors 8a, 8b as the actuator device 8 of the first moving motion unit 3 according to the first target speed Vw1_cmd_xy determined as described above. More specifically, the first control processing unit 24 determines the current command value of the each electric motor 8a, 8b by feedback control processing so that actual rotational speed (measured value) follows up the target value of the rotational speed of the each electric motor 8a, 8b decided by the first target speed Vw1_cmd_xy, and executes energization of the each electric motor 8a, 8b according to this current command value.

By processing described above, in a state where the post-restriction center of gravity target speed Vb_cmd_xy is a constant value, motion of the vehicle 1 is settled, and the vehicle 1 is moving straight at a constant speed, the vehicle system center of gravity of the entirety exists just above the grounding point of the first moving motion unit 3. In this state, the actual inclination angle $\theta b\_act\_xy$ of the occupant riding section 5 becomes $-Ofst\_xy/(h-r\_xy)$ based on the expressions (1b, (2b)). Also, the actual inclination angular velocity $\omega b\_act\_xy$ of the occupant riding section 5 becomes zero, and the target translational acceleration DVw1_cmd_xy becomes zero. From this fact and the block diagram of FIG. 4, agreement of Vb_estm1_xy and Vb_cmd_xy is derived.

More specifically, the first target speed Vw1_cmd_xy of the first moving motion unit 3 is basically determined so that the deviation of the post-restriction center of gravity target speed Vb_cmd_xy and the first estimate value Vb_estm1_xy of the vehicle system center of gravity of the entirety converges to zero.

Also, each rotational speed of the electric motor 8a, 8b as the actuator device 8 of the first moving motion unit 3 is controlled so as not to deviate from a predetermined allowable range by processing of the processing unit 32e while compensating the effect of the event that the position of the vehicle system center of gravity of the entirety shifts from the position of the reference Ps_xy in the inverted pendulum model.

In addition, because Vb_cmpn_cmd_x=Vb_cmd_x−Vofs_x=Vb_cmd_x−(Kth_x/h−r_x)·(1/Kvb_x)·Ofst_estm_x and Vb_cmpn_cmd_y=Vb_cmd_y−Vofs_y=Vb_cmd_y−(Kth_y/h−r_y)·(1/Kvb_y)·Ofst_estm_y in the expressions (4a), (4b), the expressions (4a), (4b) can be rewritten to expressions (4a)', (4b)' below, respectively.

$$DVw1\_cmd\_x = Kvb\_x \cdot (Vb\_cmd\_x - Vb\_estm1\_x) - Kth\_x \cdot (Ofst\_estm\_x/(h-r\_x) + \theta b\_act\_x) - Kw\_x \cdot \omega b\_act\_x \quad (4a)'$$

$$DVw1\_cmd\_y \cdot Kvb\_y \cdot (Vb\_cmd\_y - Vb\_estm1\_y) - Kth\_y \cdot (Ofst\_estm\_y/(h-r\_y) + \theta b\_act\_y) - Kw\_y \cdot \omega b\_act\_y \quad (4b)$$

In this case, the second term of the right side of the expressions (4a)', (4b)' has the meaning as the feedback manipulated variable component for bringing the actual position of the vehicle system center of gravity of the entirety in the X-axis direction and the Y-axis direction to the position just above the grounding part of the first moving motion unit 3.

Above is the detail of processing of the first control processing unit 24 in the present embodiment.

Next, processing of the second control processing unit 25 will be described referring to FIG. 8. Roughly speaking on processing thereof, the second control processing unit 25 determines presence/absence of the request for turning the vehicle 1 (hereinafter referred to as a turning request) or the degree of the turning request based on the actual motion state in the Y-axis direction (the right/left direction of the occupant) of the representative point of the vehicle 1 such as the vehicle system center of gravity of the entirety or the first moving motion unit 3 or the motion state of the target, or the action state of the occupant in relation with the motion states.

In the present embodiment, as an indicator for determining presence/absence of the turning request or the degree of the turning request, the estimate value Vb_estm1_y of the moving speed in the Y-axis direction of the vehicle system center of gravity of the entirety (corresponding to the "designated state variable") calculated by the center of gravity speed estimation unit 33 is used. Also, because Vb_estm1_y agrees to the moving speed in the Y-axis direction of the reference Ps_y, it has the meaning as an observed value of the moving speed in the Y-axis direction of the representative point that is fixed with respect to the occupant riding section 5 (or the base 2).

Further, when it is determined that there is a turning request, in order to make the vehicle 1 turn, the second control processing unit 25 determines the second target speed Vw2_cmd_y in the Y-axis direction of the second moving motion unit 4 so as to be different from the first target speed Vw1_cmd_y in the Y-axis direction of the first moving motion unit 3.

Such processing of the second control processing unit 25 is executed specifically as described below. With reference to FIG. 8, the second control processing unit 25 executes a filtering processing by a low pass filter 251. To the low pass filter 251, the estimate value Vb_estm1_y (newest value) of the moving speed in the Y-axis direction of the vehicle system center of gravity of the entirety calculated by the center of gravity speed estimation unit 33 is inputted. From the low pass filter 251, a low frequency component of the estimate value Vb_estm1_y of the moving speed in the Y-axis direction of the vehicle system center of gravity of the entirety is outputted.

The high/low degree of the frequency is defined on the basis of the cut-off frequency $\omega 0=(1/T)$ (T is a time constant) determining the characteristic of the low pass filter 251 as a primary delay element. More specifically, with the long/short degree of the time constant T being adjusted, a frequency band capable of passing through the low pass filter 251 out of the input signal can be changed.

The second control processing unit 25 executes processing of a processing unit 252. The processing unit 252 outputs a high frequency component (a designated frequency component) of the estimate value Vb_estm1_y of the moving speed in the Y-axis direction of the vehicle system center of gravity of the entirety by deducting the low frequency component of the estimate value Vb_estm1_y of the moving speed in the Y-axis direction of the vehicle system center of gravity of the entirety from the estimate value Vb_estm1_y. Thus, an additional configuration such as a bypass filter and the like for extracting a high frequency component can be omitted.

The second control processing unit 25 executes processing of a processing unit 253. The processing unit 253 outputs an estimate value of the translational moving amount in the Y-axis direction of the vehicle system center of gravity of the entirety as an integration value of the estimate value Vb_estm1_y of the moving speed in the Y-axis direction of the vehicle system center of gravity of the entirety which is an integration element and an input signal.

The second control processing unit 25 executes processing of a turning suppression factor calculation unit 254. To the turning suppression factor calculation unit 254, the estimate value Vb_estm1_y of the moving speed in the Y-axis direction of the vehicle system center of gravity of the entirety and the high frequency component thereof as well as the estimate value of the translational movement amount in the Y-axis direction of the vehicle system center of gravity of the entirety are inputted. From the turning suppression factor calculation unit 254, a turning suppression factor K$\omega$z is outputted.

The turning suppression factor K$\omega$z makes at least a part of the numerical range [0, 1] a value range, turning of the vehicle 1 is suppressed as the value thereof is closer to 0, whereas turning of the vehicle 1 is promoted as the value thereof is closer to 1.

The turning suppression factor K$\omega$z is set to 1 when a high frequency component of Vb_estm1_y is not extracted (when the absolute value of the spectrum of the high frequency component is a threshold value or less), and is set to a value lower than 1 when the high frequency component of Vb_estm1_y has been extracted. For example, when the high frequency component is extracted at the time t=t0 of FIG. 9, as shown in the single-dot chain line or two-dot chain line, the value of K$\omega$z is set so as to gradually reduce from 1 at the time t=t0 and onward. The lowering rate of the value of K$\omega$z may be set to various values.

If |Vb_estm1_xy| is not 0 or is a reference value or more when the high frequency component of Vb_estm1_y is extracted, the turning suppression factor K$\omega$z is set to a value lower than that of a case other than that. For example, when the vehicle is translated at the time t=t0 of FIG. 9, the value of K$\omega$z is set as shown in the single-dot chain line, whereas when the vehicle is not translated at the time t=t0, the value of K$\omega$z is set as shown in the two-dot chain line. More specifically, the value of K$\omega$z is set to a lower value in the former case compared to the latter case.

With a provision that the magnitude of the moving distance or the translational speed or the turning angular velocity (the turning rate) of the vehicle 1 becomes a threshold value or more after the value of the turning suppression factor K$\omega$z is set to a value lower than 1, the turning suppression factor K$\omega$z is set to a value higher than that before. For example, when the translational speed in the Y-axis direction of the vehicle 1 at the time t=t0 and onward becomes a threshold value or more at the time t=t1 of FIG. 9, the value of K$\omega$z is set to a value that becomes gradually larger according to an increase function of the translation distance at the time t=t1 and onward as shown in the single-dot chain line. When |Vb_estm1_y| becomes a threshold value or more at the time t=t2 of FIG. 9, the value of K$\omega$z is set so as to gradually increase at the time t=t2 and onward as shown in the two-dot chain line.

The second control processing unit 25 executes processing of a processing unit 41. To the processing unit 41, a low frequency component of the estimate value Vb_estm1_y (newest value) of the moving speed in the Y-axis direction of the vehicle system center of gravity of the entirety is inputted. Also, the processing unit 41 determines the speed after dead zone processing Vw1a_y according to the low frequency component of Vb_estm1_y.

When the occupant of the vehicle 1 intends to turn the vehicle 1 to the right or left, the occupant normally tries to shift the center of gravity of himself or herself to the right or left of the vehicle 1 by tilting the upper body of the occupant himself or herself to the right or left. At this time, the first target speed Vw1_cmd_y in the right/left direction of the first moving motion unit 3 determined by control processing of the first control processing unit 24 basically becomes the moving speed to the right or to the left.

However, even when the occupant does not intend to turn the vehicle 1, the center of gravity of the occupant himself or herself may possibly shifts to the right or left to some extent by drift of the upper body of the occupant.

Figure 8:
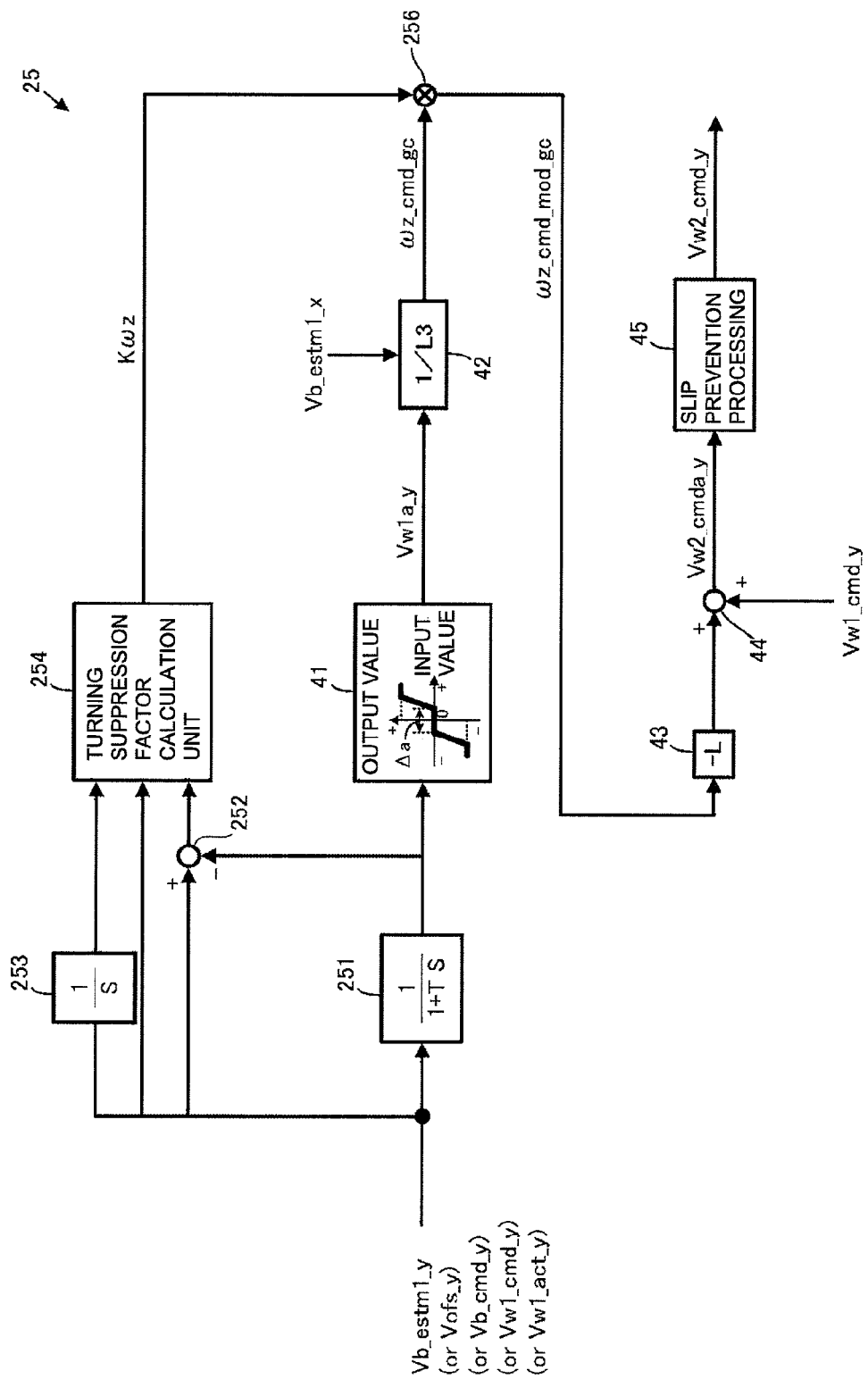
FIG. 8 is a block diagram showing processing of the second control processing unit shown in FIG. 3.

Therefore, by the characteristic of the graph shown in FIG. 8, the processing unit 41 determines the speed after the dead zone processing Vw1a_y according to Vb_estm1_y. More specifically, when the absolute value of Vb_estm1_y is comparatively small and Vb_estm1_y is a value within a predetermined range Δa with zero taken in the center (when the absolute value of Vb_estm1_y is equal to or less than a predetermined value determined beforehand), the processing unit 41 deems that there is no turning request, and makes Vw1a_y zero.

Also, when the absolute value of Vb_estm1_y is comparatively large and Vb_estm1_y is a value out of the predetermined range Δa (when the absolute value of Vb_estm1_y is larger than the predetermined value determined beforehand), the processing unit 41 deems that there is a turning request, and sets Vw1a_y to a value that is not zero.

More specifically, the processing unit 41 determines Vw1a_y according to Vb_estm1_y so that the absolute value of Vw1a_y increases accompanying increase of the absolute value of Vb_estm1_y in the range of a predetermined upper limit value or less. In this case, the polarity (direction) of Vw1a_y is made to be the same as that of Vb_estm1_y. As described below, in order to set the center of turning to a preferable position, the increase ratio of the absolute value of Vw1a_y with respect to the increase of the absolute value of Vb_estm1_y is preferable to be 1. More specifically, in a region excluding the dead zone and the saturate region in the graph of FIG. 8, the inclination is preferable to be 1.

Also, in FIG. 8, the reference signs in parentheses on the input side of the processing unit 41 relate to the modifications described below.

Next, the second control processing unit 25 executes processing of a processing unit 42. This processing unit 42 determines the target turning angular velocity ωz_cmd_gc that is the target value of the turning angular velocity (the angular velocity in the direction around the yaw axis) of the vehicle 1 by dividing Vw1a_y by distance L3 in the X-axis direction between the grounding part of the first moving motion unit 3 and the center of turning. In this case, the processing unit 42 sets the distance L3 according to the estimate value Vb_estm1_x (newest value) of the actual moving speed in the X-axis direction of the vehicle system center of gravity of the entirety as the representative point of the vehicle 1.

Also, more specifically, the center of turning means the center of rotation in the direction around the yaw axis of the entirety of the vehicle 1 as viewed on the coordinate system that translationally moves on the floor surface integrally with the first moving motion unit 3.

In the present embodiment, turning of the vehicle 1 is executed in the direction around the yaw axis with a point on the floor surface on the rear side of the grounding part of the first moving motion unit 3 (the rear side of the occupant riding on the occupant riding section 5) being the center of turning. Also, when Vb_estm1_x is zero, the distance L3 in the X-axis direction between the center of turning and the grounding part of the first moving motion unit 3 is set so that the center of turning comes to a position in the vicinity of the grounding part of the second moving motion unit 4. For example, L3 is set so as to agree or generally agree to the distance between the grounding part of the first moving motion unit 3 and the grounding part of the second moving motion unit 4.

Also, when Vb_estm1_x is positive which is the case of moving forward, L3 is set so that the center of turning approaches the grounding part side of the first moving motion unit 3 from the grounding part side of the second moving motion unit 4 (so that the position in the X-axis direction of the center of turning approaches the position just below the occupant riding on the occupant riding section 5 (the position where the occupant is projected to the floor surface)) as the magnitude (absolute value) of Vb_estm1_x increases. That is, L3 is set so as to reduce as the magnitude (absolute value) of Vb_estm1_x increases. However, L3 is restricted to a distance of a predetermined lower limit value (>0) or more.

When Vb_estm1_x is negative which is the case of moving rearwardly, L3 is preferable to be set to be the same as a value of a case where Vb_estm1_x is zero, or to increase as the magnitude (absolute value) of Vb_estm1_x increases.

The processing unit 42 determines the target turning angular velocity ωz_cmd_gc by dividing Vw1a_y by the distance L3 that is determined thus according to Vb_estm1_x. Also, ωz_cmd_gc is the angular velocity of the left turn (counterclockwise) when Vw1a_y is the leftward velocity, and is the angular velocity of the right turn (clockwise) when Vw1a_y is the rightward velocity.

The second control processing unit 25 executes processing of a processing unit 256. The processing unit 256 calculates the post-correction target turning angle ωz_cmd_mod_gc by multiplying the target turning angular velocity ωz_cmd_gc determined by the processing unit 42 by the turning suppression factor Kωz determined by the turning suppression factor calculation unit 254.

Next, the second control processing unit 25 executes processing of a processing unit 43. The processing unit 43 calculates the relative moving speed ΔVw2_cmd_y in the Y-axis direction of the second moving motion unit 4 with respect to the first moving motion unit 3 of a case where the vehicle 1 is turned at the post-correction target turning angular velocity ωz_cmd_mod_gc by multiplying the post-correction target turning angular velocity ωz_cmd_mod_gc determined by the processing unit 256 by a value (=−L) that is (−1) times of the predetermined distance between the grounding part of the first moving motion unit 3 and the grounding part of the second moving motion unit 4.

The relative moving speed ΔVw2_cmd_y in the Y-axis direction of the second moving motion unit 4 calculated thus becomes zero in the case of ωz_cmd_gc=0 (when there is no turning request) or in the case of Kωz=0 (when turning is entirely suppressed). Even in the case of ωz_cmd_gc≠0 (when there is a turning request), in the case of Kωz<1, ΔVw2_cmd_y becomes a small value so that turning according to the turning request is suppressed.

Also, ΔVw2_cmd_y is a rightward velocity when ωz_cmd_gc is a turning angular velocity of the left turn, and is a leftward velocity when ωz_cmd_gc is a turning angular velocity of the right turn. Therefore, ΔVw2_cmd_y of a case where there is a turning request is a velocity of the direction opposite to that of Vw1a_y or Vb_estm1_y.

Next, the second control processing unit 25 executes processing of a processing unit 44. This processing unit 44 determines the basic value Vw2_cmda_y (newest value) of the second target speed Vw2_cmd_y in the Y-axis direction of the second moving motion unit 4 by adding the relative moving speed ΔVw2_cmd_y in the Y-axis direction of the second moving motion unit 4 to the first target speed Vw1_cmd_y (newest value) in the Y-axis direction of the first moving motion unit 3 determined by the first control processing unit 24.

Next, the second control processing unit 25 executes processing of a processing unit 45. This processing unit 45 determines the second target speed Vw2_cmd_y in the Y-axis direction of the second moving motion unit 4 by executing slip preventing processing for preventing slip of the second moving motion unit 4.

In this case, when slip of the second moving motion unit 4 is anticipated to be liable to occur, for example, in the case where the absolute value of the basic value Vw2_cmda_y is excessively large, the processing unit 45 sets the second target speed Vw2_cmd_y in the Y-axis direction of the second moving motion unit 4 to a speed that is corrected from the basic value Vw2_cmda_y. Also, when slip of the second moving motion unit 4 is not anticipated to occur, the processing unit 45 determines the basic value Vw2_cmda_y as it is as the second target speed Vw2_cmd_y in the Y-axis direction of the second moving motion unit 4.

Further, when the friction force between the second moving motion unit 4 and the floor surface can be secured sufficiently, for example, in the case where the second moving motion unit 4 is pressed to the floor surface by a spring and the like, processing of the processing unit 45 may be omitted.

Also, the second control processing unit 25 controls the electric motor 17 as the actuator device of the second moving motion unit 4 according to the second target speed Vw2_cmd_y determined as described above. More specifically, the second control processing unit 25 determines the current command value of the electric motor 17 by feedback control processing so that the actual rotational speed (measured value) follows up the target value of the rotational speed of the electric motor 17 decided by the second target speed Vw2_cmd_y, and executes energization of the electric motor 17 according to this current command value.

Control processing of the second control processing unit 25 is executed as described above. Thus, the second target speed Vw2_cmd_y in the Y-axis direction of the second moving motion unit 4 is determined basically to a speed obtained by adding the relative moving speed ΔVw2_cmd_y to the first target speed Vw1_cmd_y (newest value) in the Y-axis direction of the first moving motion unit 3.

In this case, under the situation that the absolute value of the estimate value Vb_estm1_y of the moving speed in the Y-axis direction of the vehicle system center of gravity of the entirety is small enough and it is determined that there is no turning request, ΔVw2 cmd_y=0 is resulted, and therefore the second target speed Vw2_cmd_y in the Y-axis direction of the second moving motion unit 4 is basically determined so as to agree to the first target speed Vw1_cmd_y in the Y-axis direction of the first moving motion unit 3.

On the other hand, under the situation that the absolute value of the estimate value Vb_estm1_y of the moving speed in the Y-axis direction of the vehicle system center of gravity of the entirety is comparatively large and it is determined that there is a turning request, ΔVw2_cmd_y is determined to a velocity with the direction opposite to that of Vb_estm1_y. Therefore, the second target speed Vw2_cmd_y in the Y-axis direction of the second moving motion unit 4 is basically determined to a velocity with the direction the same as that of the first target speed Vw1_cmd_y in the Y-axis direction of the first moving motion unit 3 and with a magnitude smaller than that of Vw1_cmd_y (a velocity of zero or near to zero), or is determined to a velocity with the direction opposite to that of the first target speed Vw1_cmd_y in the Y-axis direction of the first moving motion unit 3.

According to the vehicle 1 exerting the functions described above, the estimate value Vb_estm1_y (the observed value of the designated state variable) of the moving speed in the Y-axis direction of the vehicle system center of gravity of the entirety is determined by the control device 21 based on the actual inclination angular velocity ωb_act_xy of the occupant riding section 5 (or base 2) (the detection result of the inclination state of the occupant riding section 5) (refer to the expression (3b) and FIG. 4/center of gravity speed estimation unit 33). Also, the value of the turning suppression factor Kωz and the post-correction target turning angle ωz_cmd_mod_gc of the vehicle 1 are set by the control device 21 according to the presence/absence or the magnitude of the high frequency component (designated frequency component) in Vb_estm1_y (refer to FIG. 8/processing units 251, 252, 254 and 256).

Figure 10:
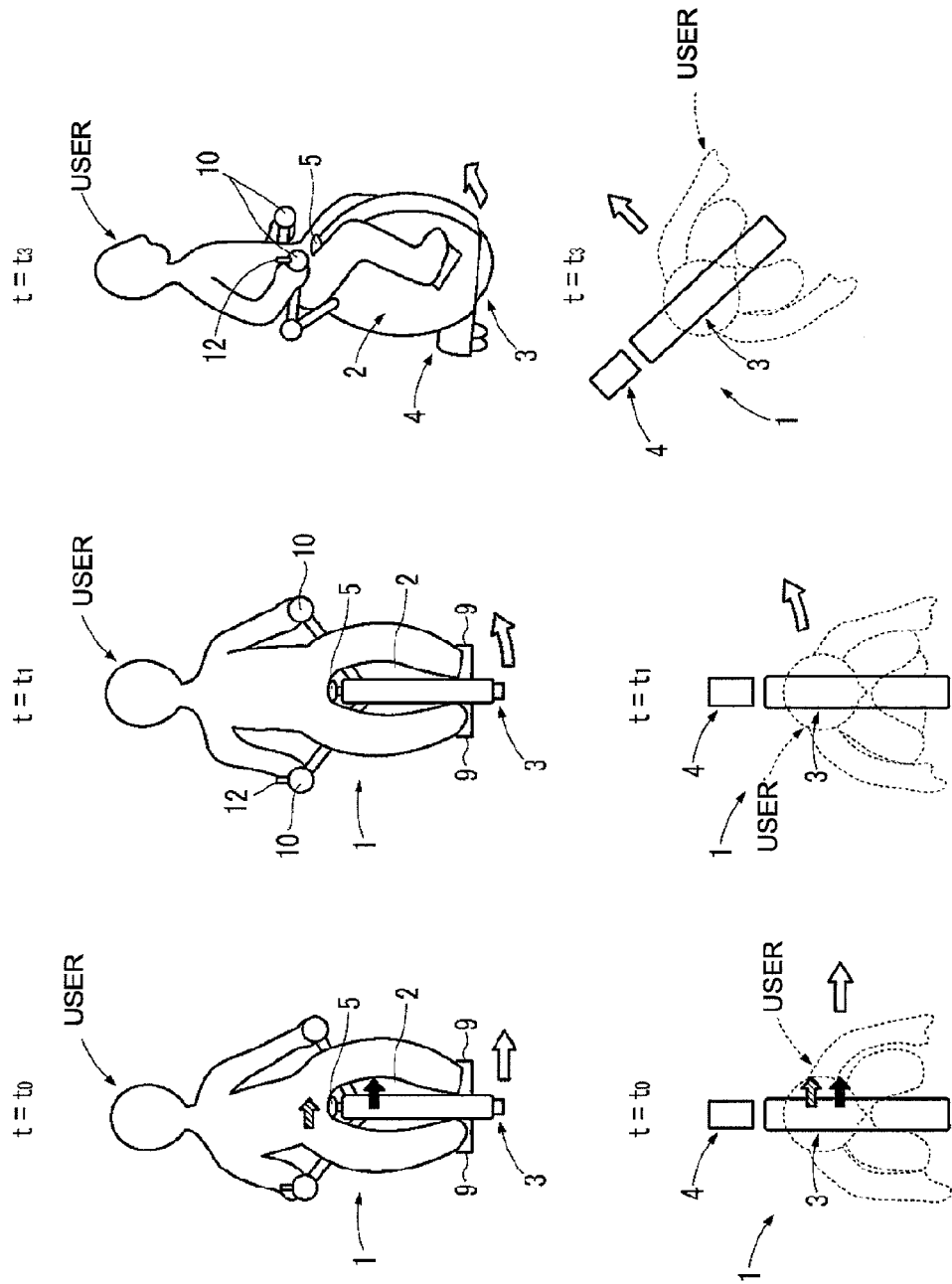
FIG. 10 is an explanatory drawing in relation with a motion example of the vehicle.

As shown in FIG. 10, a case where the vehicle 1 acts in order of the time t=t0, t1 and t3 will be considered as an example. In FIG. 10, the arrow with oblique lines expresses movement of the waist of the operator, the black arrow expresses tilting of the occupant riding section 5, and the white arrow expresses movement of the vehicle system center of gravity of the entirety. In this example, at the time t=t0, the operator sitting on the occupant riding section 5 moves the waist to the left intending translation to the left direction, and tilts the occupant riding section 5 to the left side with respect to the vertical axis.

By the motion of the waist of the operator at the time t=t0, all of the actual inclination angle θb_act_y and the inclination angular velocity ωb_act_y around X-axis of the occupant riding section 5 (or the base 2) as well as the speed estimate value Vb_estm1_y in the Y-axis direction of the vehicle system center of gravity of the entirety become positive values (refer to the expression (3b) and FIG. 4/center of gravity speed estimation unit 33). As a result, the first target speed Vw1_cmd_y in the Y-axis direction of the first moving motion unit 3 is determined so as to translate the first moving motion unit 3 to the left direction (refer to the expression (4b), FIG. 4/the attitude control calculation unit 34, and FIG. 5).

When movement of the waist of the operator at the time t=t0 is slow to a degree within the dead zone of the processing unit 41, the target turning angular velocity ωz_cmd_gc is st to 0. Therefore, when it is not expected that slip would occur in the second moving motion unit 4, the second target speed Vw2_cmd_y thereof in the Y-axis direction agrees to the first target speed Vw1_cmd_y in the Y-axis direction of the first moving motion unit 3 (refer to FIG. 8 for the above). As a result, the motion of the actuator devices 8a, 8b and 17 of the vehicle 1 is controlled so that the vehicle system center of gravity of the entirety moves to +Y-axis direction.

Figure 9:
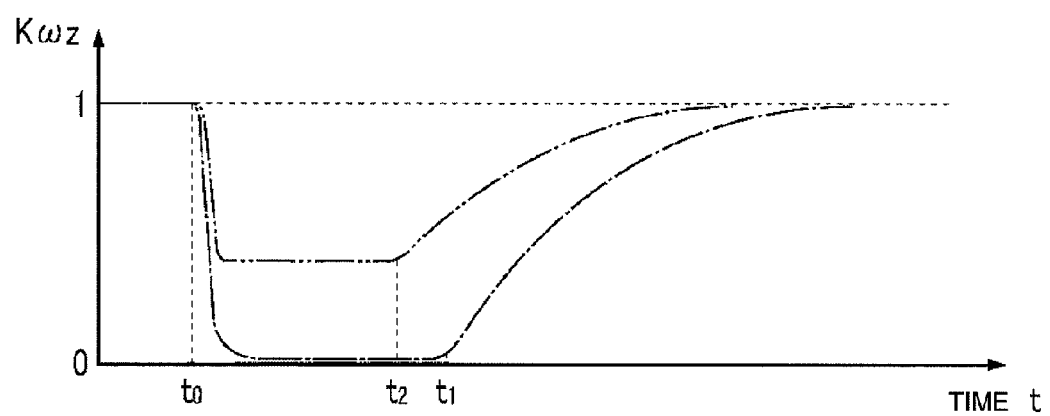
FIG. 9 is an explanatory drawing in relation with control of the turning condition of the vehicle.

On the other hand, when Vb_estm1_y (to be precise, the low frequency component thereof) deviates from the dead zone of the processing unit 41 and movement of the waist of the operator at the time t=t0 is sudden enough to generate a high frequency component in Vb_estm1_y, the target turning angular velocity ωz_cmd_gc is set to a positive value or a negative value depending on the deviation amount, and the turning suppression factor Kωz is adjusted to 0 (refer to FIG. 8 and the single-dot chain line at the time t=t0 and onward of FIG. 9). Therefore, in the period of the time t=t0 and the time t=t1 of FIG. 10, the motion of the actuator devices 8a, 8b and 17 of the vehicle 1 is controlled so that turning of the vehicle 1 is suppressed and the vehicle system center of gravity of the entirety is translated to the +Y-axis direction.

Thus, with the tilting condition of the occupant riding section 5 promoting turning of the vehicle 1 contrary to the intention of the operator and the tilting condition of the occupant riding section 5 generating or increasing a high frequency component in Vb_estm1_y being correlated to each other, an event wherein the turning of the vehicle 1 is promoted contrary to the intention of the operator is avoided.

Also, when the vehicle 1 is being translated, turning of the vehicle 1 is strongly suppressed (refer to FIG. 9/the single-dot chain line and the two-dot chain line). Thus, because an event wherein the turning of the vehicle 1 is promoted contrary to the intention of the operator in a situation wherein the probability that the operator intends translation of the vehicle 1 is high is avoided, continuity in vehicle steering feeling can be secured.

Also, when the translation distance in the Y-axis direction of the vehicle 1 at the time t=t0 and onward becomes a threshold value or more at the time t=t1 of FIG. 10, turning of the vehicle 1 is promoted at the time t=t1 and onward (refer to FIG. 9/the single-dot chain line of t=t1 and onward). More specifically, when the low frequency component of Vb_estm1_y is large enough to deviate from the dead zone of the processing unit 41, by multiplying ωz_cmd_gc depending on it by the turning suppression factor Kωz whose value is larger than before, the post-correction target turning angle ωz_cmd_mod_gc larger than before is determined (refer to FIG. 8).

Thus, as the moving distance after suppressing turning of the vehicle 1 (t=t0 and onward) increases, turning of the vehicle 1 is gradually promoted, an event that the vehicle 1 turns suddenly contrary to the intention of the operator is avoided. Therefore, continuity in vehicle steering feeling can be secured.

Further, also in a case where the translational speed or the turning angular velocity in the Y-axis direction of the vehicle 1 becomes a threshold value or more, turning of the vehicle 1 is promoted (refer to FIG. 9/the two-dot chain line of t=t2 and onward). Thus, because an event wherein the vehicle 1 turns suddenly contrary to the intention of the operator is avoided, continuity in vehicle steering feeling can be secured.

When the turning suppression factor Kωz is returned to 1 after the vehicle 1 shifts to the state of t=t3 as a result of turning from the state of the time t=t1, based on the extraction result and the like of a high frequency component in Vb_estm1_y, the motion of the vehicle 1 is controlled as described above.

In the vehicle 1 of the present embodiment described above, translational movement of the vehicle 1 in the X-axis direction can be executed according to tilting in the front/rear direction (the X-axis direction) of the occupant riding section 5 (or the base 2) accompanying movement of the body of the occupant riding on the occupant riding section 5, or according to the advancing/retreating command outputted according to the swing operation in the front/rear direction of the joy stick 12.

Also, under such a situation wherein the movement in the right/left direction of the center of gravity of the occupant himself or herself riding on the occupant riding section 5 (relative movement with respect to the occupant riding section 5) is comparatively small and the estimate value Vb_estm1_y of the moving speed in the Y-axis direction of the vehicle system center of gravity of the entirety falls within a predetermined range Δa in the vicinity of zero, translational movement of the vehicle 1 the Y-axis direction can be executed according to minute tilting in the right/left direction (the Y-axis direction) of the occupant riding section 5 (or the base 2), or according to the transverse movement command outputted according to the swing operation in the right/left direction of the joy stick 12.

Further, combining these translational movements, translational movement of the vehicle 1 can be executed also in an optional direction oblique with respect to the X-axis direction and the Y-axis direction.

Also, when the estimate value Vb_estm1_y of the moving speed in the Y-axis direction of the vehicle system center of gravity of the entirety deviates from the predetermined range Δa in the vicinity of zero because the occupant riding on the occupant riding section 5 moves the center of gravity of the occupant himself or herself comparatively largely in the right/left direction, the second target speed Vw2_cmd_y in the Y-axis direction of the second moving motion unit 4 is determined to a speed shifted from the first target speed Vw1_cmd_y in the Y-axis direction of the second moving motion unit 4 by ΔVw2_cmd_y. Further, in this case, the second target speed Vw2_cmd_y is determined to such speed that makes the vehicle 1 turn around the center of turning on the rear side of the grounding part of the first moving motion unit 3.

Therefore, the occupant can turn the vehicle 1 only by moving the upper body so as to move the center of gravity of the occupant himself or herself in the right/left direction. Also, in this case, the vehicle 1 turns to the left when the occupant moves the center of gravity of the occupant himself or herself to the left, and the vehicle 1 turns to the right when the occupant moves the center of gravity of the occupant himself or herself to the right. Accordingly, the movement of the center of gravity of the occupant in the right/left direction and the turning direction of the vehicle 1 conform to each other.

Therefore, the occupant can easily turn the vehicle 1 by movement in the right/left direction of the upper body of the occupant himself or herself, and can easily master the steering operation for turning the vehicle 1.

Also, for example, when the vehicle 1 is to be turned (direction change) in a stop state of the vehicle 1 (the state in which movement of the first moving motion unit 3 and the second moving motion unit 4 almost stops), the first moving motion unit 3 that supports the weight of the occupant and the weight of the major part of the vehicle 1 comes to move in the right/left direction (the Y-axis direction). Therefore, a large friction force can be prevented from being applied to the first moving motion unit 3. Accordingly, the turning (direction change) of the vehicle 1 can be executed smoothly.

Also, when the vehicle 1 is to be turned while the vehicle 1 is moved in the forward direction (the positive direction of X-axis), as the magnitude (absolute value) of the estimate value Vb_estm1_x of the moving speed in the X-axis direction of the vehicle system center of gravity of the entirety as a representative point of the vehicle 1 is larger, the distance L3 between the grounding part of the first moving motion unit 3 and the center of turning becomes smaller, and therefore the occupant can easily make the movement trajectory in turning of the vehicle 1 line with a desired trajectory.

Also, in the present embodiment, the center of gravity shift estimation unit 35a of the first control processing unit 24 estimates the center of gravity shift amount Ofst_xy of the entirety center of gravity of the vehicle system by the process shown in FIG. 7. Therefore, the center of gravity shift amount can be estimated accurately. Also, as described above, according to the estimate value Ofst_estm_xy of this center of gravity shift amount Ofst_xy, the target speed (post-restriction center of gravity target speed) Vb_cmd_xy of the vehicle system center of gravity of the entirety is determined Therefore, the effect exerted on the behavior of the vehicle 1 by the center of gravity shift amount Ofst_xy can be properly compensated.

Further, in the vehicle 1 of the present embodiment, the swing amount (the swing amount in the direction around Y-axis) of the second moving motion unit 4 with respect to the base 2 is mechanically restricted to within a predetermined range defined by the stoppers 16, 16. Therefore, in particular, the occupant riding section 5 can be prevented from tilting excessively to the rear side which is hard for the occupant to visually confirm.

Next, some modifications of the respective embodiments described above will be described.

In the embodiment described above, the tilting condition of the occupant riding section 5 leading to the vehicle turning condition contrary to the intention of the operator and the tilting condition of the occupant riding section 5 generating a high frequency component (designated frequency component) in the estimate value Vb_estm1_y of the moving speed in the Y-axis direction of the vehicle system center of gravity of the entirety (the observed value of the designated state variable) were correlated to each other. That is, the tilting condition of the occupant riding section 5 achieving the vehicle turning condition agreeing to the intention of the operator and the tilting condition of the occupant riding section 5 not generating a high frequency component in Vb_estm1_y were correlated to each other.

As another embodiment, the tilting condition of the occupant riding section 5 achieving the vehicle turning condition agreeing to the intention of the operator and the tilting condition of the occupant riding section 5 generating a high frequency component in Vb_estm1_y may be correlated to each other. In this case, when a high frequency component is extracted, the value of the turning suppression factor Kωz is set so as to be larger than that of the case a high frequency component is not extracted. As a result, the vehicle 1 is promoted.

In the embodiment described above, although the translational speed in the Y-axis direction of the entirety center of gravity of the vehicle was employed as the designated state variable, as another embodiment, alternatively or additionally, at least one of the translational speed in the X-axis direction of the entirety center of gravity of the vehicle, the inclination angular velocity around X-axis or Y-axis of the occupant riding section 5, and the turning angular velocity of the vehicle 1 may be employed as the designated state variable.

As the designated frequency component, instead of a high frequency component, a low frequency component may be extracted, and an intermediate frequency component between a high frequency band and a low frequency band may be extracted.

In the embodiment described above, the turning condition of the vehicle 1 was controlled based on the designated frequency component of the command value or the observed value of the designated state variable, the translational speed or the turning angular velocity of the vehicle 1, and the translation distance of the vehicle 1.

As another embodiment, the turning condition of the vehicle 1 may be controlled based on the designated frequency component of the command value or the observed value of the designated state variable and either or both of the translational speed or the turning angular velocity and the translation distance of the vehicle 1. For example, inputting of Vb_estm1_y and the integration value thereof may be omitted for the turning suppression factor calculation unit 254, and the value of Kωz may be adjusted so as to temporarily drop according to the input of the high frequency component of Vb_estm1_y (refer to FIG. 9/the single-dot chain line and the two-dot chain line).

Inputting of Vb_estm1_y to the turning suppression factor calculation unit 254 may be omitted, and the value of Kωz may be adjusted so as to temporarily drop according to the input of the high frequency component of Vb_estm1_y and to thereafter rise after the moving distance of the vehicle 1 (the integration value of Vb_estm1_y) becomes a threshold value or more (refer to FIG. 9/the single-dot chain line). Inputting of the integration value of Vb_estm1_y may be omitted for the turning suppression factor calculation unit 254, and the value of Kωz may be adjusted so as to temporarily drop according to the input of the high frequency component of Vb_estm1_y and to thereafter rise after the magnitude of the translational speed of Vb_estm1_y of the vehicle 1 becomes a threshold value or more (refer to FIG. 9/the two-dot chain line).

The control device 21 may be configured so as to lower the steering sensitivity of the vehicle 1 in the warming up period from start of the vehicle 1 until a constant time elapses compared to that in the normal operation period thereafter. In order to lower the steering sensitivity of the vehicle 1, for example, the dead zone of the processing unit 32c (refer to FIG. 4) of the center of gravity target speed determination unit 32 forming the first control processing unit 24 is widened temporarily in the warming up period. Thus, the situation that the vehicle 1 starts to move in the warming up period can be avoided.

The control device 21 may be configured so as to lower the steering sensitivity of the vehicle 1 intermittently or continuously when abnormality is detected in the vehicle 1. Thus, such a situation is avoided wherein the damage is increased because the vehicle 1 is still used continuously even if an abnormality occurs in the vehicle 1. The control device 21 may be configured so as to display presence/absence of an abnormality detection or the kind of abnormality on the indicator or to make a speaker output the same by sound.

As the abnormality, a system error such as a noise-originated communication abnormality of the control device 21, a significant drop of the storage quantity of the on-vehicle battery, an overheating of a constituting component of the vehicle 1, an excessive supply current to the electric equipment that is a constituting component of the vehicle 1, and the like can be cited. In order to lower the steering sensitivity of the vehicle 1, for example, at least one of a limit value in the X-axis direction and the Y-axis direction of the processing unit 32e of the center of gravity target speed determination unit 32 (refer to FIG. 4) forming the first control processing unit 24 and a limit value in the Y-axis direction of the processing unit 41 (refer to FIG. 8) forming the second control processing unit 25 is adjusted so as to gradually approach 0 after abnormality detection.

The control device 21 may be configured so as to raise the steering sensitivity of the vehicle 1 so as to approach the initial steering sensitivity according to state change after abnormality detection of the vehicle 1. Thus, movement of the vehicle 1 to the maintenance location and the like after the occurrence of an abnormality becomes possible or easy.

For example, when the event that the operator gets down from the occupant riding section 5 is detected after drop of the storage quantity of the battery is detected, the steering sensitivity of the vehicle 1 may be raised. When the event that the temperature of a constituting component of the vehicle 1 has dropped to a normal temperature is confirmed after overheat of the constituting component is detected, the steering sensitivity of the vehicle 1 may be raised. When the event that the supply current to a constituting component of the vehicle 1 has restored to a normal value is confirmed after excessive supply current to the constituting component of the vehicle 1 is detected, the steering sensitivity of the vehicle 1 may be raised.

In the respective embodiments, in processing of the second control processing unit 25, as an indicator for determining presence/absence of the turning request or the degree of the turning request, the estimate value Vb_estm1_y of the moving speed in the Y-axis direction of the entirety center of gravity of the vehicle calculated by the center of gravity speed estimation unit 33 was used. However, as an indicator for determining presence/absence of the turning request or the degree of the turning request, a parameter other than Vb_estm1_y may be used.

For example, as shown in the reference signs in parentheses of FIG. 8, the target turning angular velocity ωz_cmd_gc of the vehicle 1 may be determined by executing processing of the processing units 41, 42 similarly to the embodiments using, instead of Vb_estm1_y, the center of gravity shift effect amount Vofs_y in the Y-axis direction (or the center of gravity shift amount estimate value Ofst_estm_xy) calculated by the center of gravity shift effect amount calculation unit 35b of the first control processing unit 24, or the post-restriction speed command V2_cmd_y in the Y-axis direction determined by the processing unit 32e, or the first target speed Vw1_cmd_y in the Y-axis direction of the first moving motion unit 3 determined by the attitude control calculation unit 34, or the observed value of the actual moving speed Vw1_act_y in the Y-axis direction of the first moving motion unit 3 (for example, a value of Vw1_act_y estimated from the detection value of the rotational speed of the electric motor 8b).

Also, in this case, in the processing unit 41, the range Δa (the magnitude of the upper limit value and the lower limit value of the range Δa) of a value of an input parameter making the output value of the processing unit 41 zero and the change ratio of the output value with respect to change of a value of the input parameter outside the range Δa are set for each input parameter of each kind in general.

Even when such parameters as described above which substitutes for Vb_estm1_y are used, similarly to the embodiments, the vehicle 1 can be turned according to movement in the right/left direction of the upper body of the occupant.

When the center of gravity shift effect amount Vofs_y in the Y-axis direction calculated by the center of gravity shift effect amount calculation unit 35b of the first control processing unit 24 is used instead of Vb_estm1_y, the Vofs_y is proportionate to the center of gravity shift amount estimate value Ofst_estm_y in the Y-axis direction. Therefore, to set the target turning angular velocity ωz_cmd_gc of the vehicle 1 according to Vofs_y is equivalent to setting the target turning angular velocity ωz_cmd_gc of the vehicle 1 according to the center of gravity shift amount estimate value Ofst_estm_y in the Y-axis direction.

Also, in the respective embodiments, the distance L3 between the center of turning and the grounding part of the first moving motion unit 3 when the vehicle 1 turned was changed according to the estimate value (observed value) Vb_estm_x of the moving speed in the front/rear direction of the vehicle system center of gravity of the entirety. However, L3 may be a constant value determined beforehand.

Further, in the first embodiment, the target turning angular velocity ωz_cmd_gc was set to zero when the estimate value Vb_estm1_y of the moving speed in the Y-axis direction of the vehicle system center of gravity of the entirety as the input parameter of the processing unit 41 was a value within a predetermined range Δa in the vicinity of zero. However, even when the input parameter is a value within the predetermined range Δa, the target turning angular velocity ωz_cmd_gc may be set so as to turn the vehicle 1. That is, Δa may be made zero.

Also, in the respective embodiments, one in which the second moving motion unit 4 was disposed on the rear side of the first moving motion unit 3 was shown. However, the second moving motion unit 4 may be disposed on the front side of the first moving motion unit 3. In the case, by making the moving speed in the Y-axis direction of the second moving motion unit 4 higher than the moving speed in the Y-axis direction of the first moving motion unit 3 in turning, the vehicle 1 can be turned.

In the respective embodiments, the joy stick 12 was used as an operation tool for outputting the advancing/retreating command and the transverse moving command. However, a track ball and a touch pad may be used instead of the joy stick, or otherwise, a load sensor detecting the contact position by the occupant, an attitude sensor held by the occupant, and the like may be used. Also, a portable terminal such as a smart phone for example can be used as the operation tool.

Further, the operation tool such as the joy stick 12 and the like may be omitted, or otherwise, an operation tool that outputs only the advancing/retreating command may be provided.

Also, the second moving motion unit 4 may have a structure other than the omni-wheel, or may have a structure similar to that of the first moving motion unit 3 for example.

Also, it may be configured to be capable of selecting to turn the vehicle 1 by that the occupant moves the body of the occupant himself or herself in the right/left direction by operation of a selection switch and the like by the occupant, and to turn the vehicle 1 by operation of an operation tool such as a joy stick by the occupant.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An inverted pendulum vehicle comprising:
moving motion units configured to be capable of moving in all directions on a floor surface;
actuator devices that drive the moving motion units;
a base that incorporates the moving motion units and the actuator devices;
an occupant riding section incorporated into the base so as to be tiltable with respect to a vertical direction;
an inclination state detector detecting the inclination state of the occupant riding section; and
a controller configured to control motion of the actuator devices based on a detection result of the inclination state of the occupant riding section by the inclination state detector;
wherein the controller is configured to extract a designated frequency component of a command value or an observed value of a designated state variable determined according to the detection result of the inclination state of the occupant riding section by the inclination state detector, to determine a turning factor defining a turning condition of the vehicle based on the extraction result of the designated frequency component and to control motion of the actuator devices so that the turning condition of the vehicle is controlled based on the turning factor, and that the turning of the vehicle is suppressed when a high frequency component is extracted as the designated frequency component.

2. The inverted pendulum vehicle according to claim 1, wherein the controller is configured to determine the turning factor so that turning of the vehicle according to the extraction result of the designated frequency component is suppressed when the vehicle is being translated.

3. The inverted pendulum vehicle according to claim 2, wherein the controller is configured to determine the turning factor so that turning of the vehicle is promoted intermittently or continuously as a predetermined moving distance of the inverted pendulum vehicle after suppressing turning of the vehicle is longer.

4. The inverted pendulum vehicle according to claim 2, wherein the controller is configured to determine the turning factor so that turning of the vehicle is promoted continuously or intermittently with a provision that the magnitude of a command value or an observed value of translational speed or turning angular velocity after suppressing turning of the vehicle has become a threshold value or more.

5. The inverted pendulum vehicle according to claim 1, wherein the controller is configured to determine the turning factor so that turning of the vehicle is promoted intermittently or continuously as a predetermined moving distance of the inverted pendulum vehicle after suppressing turning of the vehicle is longer.

6. The inverted pendulum vehicle according to claim 5, wherein the controller is configured to determine the turning factor so that turning of the vehicle is promoted continuously or intermittently with a provision that the magnitude of a command value or an observed value of translational speed or turning angular velocity after suppressing turning of the vehicle has become a threshold value or more.

7. The inverted pendulum vehicle according to claim 1, wherein the controller is configured to determine the turning factor so that turning of the vehicle is promoted continuously or intermittently with a provision that the magnitude of a command value or an observed value of translational speed or turning angular velocity after suppressing turning of the vehicle has become a threshold value or more.

8. The inverted pendulum vehicle according to claim 1, wherein the controller is configured to determine the turning factor using translational speed of the vehicle with respect to the tilting direction of the occupant riding section as the designated state variable.

9. The inverted pendulum vehicle according to claim 1, wherein the controller is configured to extract the designated frequency component by making only a frequency component other than the designated frequency component of a command value or an observed value of the designated state variable pass through using a filter and deducting the frequency component other than the designated frequency component from the command value or the observed value of the designated state variable.

10. An inverted pendulum vehicle comprising:
    moving motion units adapted for movement in all directions on a floor surface;
    actuator devices for driving the moving motion units;
    a base for mounting the moving motion units and the actuator devices;
    an occupant riding section incorporated into the base, said occupant riding section being tiltable with respect to a vertical direction;
    an inclination state detector detecting the inclination state of the occupant riding section; and
    a controller configured to control motion of the actuator devices based on a detection result of the inclination state of the occupant riding section by the inclination state detector;
    wherein the controller extracts a designated frequency component of a command value or an observed value of a designated state variable determined according to the detection result of the inclination state of the occupant riding section by the inclination state detector, to determine a turning factor defining a turning condition of the vehicle based on the extraction result of the designated frequency component for controlling motion of the actuator devices so that the turning condition of the vehicle is controlled based on the turning factor, and that the turning of the vehicle is suppressed when a high frequency component is extracted as the designated frequency component.

11. The inverted pendulum vehicle according to claim 10, wherein the controller is configured to determine the turning factor wherein turning of the vehicle according to the extraction result of the designated frequency component is suppressed when the vehicle is being translated.

12. The inverted pendulum vehicle according to claim 10, wherein the controller is configured to determine the turning factor wherein turning of the vehicle is promoted intermittently or continuously as a predetermined moving distance of the inverted pendulum vehicle after suppressing turning of the vehicle is longer.

13. The inverted pendulum vehicle according to claim 10, wherein the controller is configured to determine the turning factor wherein turning of the vehicle is promoted continuously or intermittently with a provision that the magnitude of a command value or an observed value of translational speed or turning angular velocity after suppressing turning of the vehicle has become a threshold value or more.

* * * * *